(12) United States Patent
Kim et al.

(10) Patent No.: US 12,056,416 B2
(45) Date of Patent: Aug. 6, 2024

(54) AUGMENTED REALITY DEVICE AND ELECTRONIC DEVICE INTERACTING WITH AUGMENTED REALITY DEVICE

(71) Applicant: Samsung Electronics Co., Ltd., Suwon-si (KR)

(72) Inventors: Seungnyun Kim, Suwon-si (KR); Hanjib Kim, Suwon-si (KR); Hyunjun Kim, Suwon-si (KR); Yongsang Yun, Suwon-si (KR); Kihuk Lee, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 17/679,700

(22) Filed: Feb. 24, 2022

(65) Prior Publication Data

US 2022/0276824 A1 Sep. 1, 2022

Related U.S. Application Data

(63) Continuation of application No. PCT/KR2022/000991, filed on Jan. 19, 2022.

(30) Foreign Application Priority Data

Feb. 26, 2021 (KR) ........................ 10-2021-0026057

(51) Int. Cl.
*G06F 3/14* (2006.01)
(52) U.S. Cl.
CPC .................................. *G06F 3/1454* (2013.01)
(58) Field of Classification Search
CPC .................................................... G06F 3/1454
(Continued)

(56) References Cited

U.S. PATENT DOCUMENTS 9,589,372 B1 3/2017 Bean et al.
2008/0024597 A1 1/2008 Yang et al.
(Continued)

FOREIGN PATENT DOCUMENTS

JP 2002-149581 A 5/2002
KR 10-2016-0023888 A 3/2016
(Continued)

OTHER PUBLICATIONS

International Search Report dated May 9, 2022, issued in International Application No. PCT/KR2022/000991.

*Primary Examiner* — Jin Ge
(74) *Attorney, Agent, or Firm* — Jefferson IP Law, LLP

(57) ABSTRACT

An augmented reality device may comprise a display, at least one sensor, a communication circuit, and at least one processor operatively connected with the display, the at least one sensor, and the communication circuit. The at least one processor may be configured to identify a first user input specifying a shared area for outputting shared content to be output on at least one other augmented reality device, transmit information about the shared area to a server through the communication circuit, based on the first user input, identify whether the shared area and a personal area for outputting personal content overlap, based on information obtained through the at least one sensor, control the display to output the shared content in the shared area and the personal content in the personal area, based on identifying that the shared area and the personal area do not overlap, and control the display to output the shared content in the shared area and the personal content in an area not overlapping the shared area, based on identifying that the shared area and the personal area overlap.

19 Claims, 18 Drawing Sheets

(58) Field of Classification Search
USPC .......................................................... 345/633
See application file for complete search history.

(56) References Cited

U.S. PATENT DOCUMENTS

| | | | |
|---|---|---|---|
| 2012/0210254 A1* | 8/2012 | Fukuchi | G06F 3/012 |
| | | | 715/757 |
| 2014/0368537 A1 | 12/2014 | Salter et al. | |
| 2014/0375683 A1* | 12/2014 | Salter | G06T 19/006 |
| | | | 345/633 |
| 2015/0317831 A1 | 11/2015 | Ebstyne et al. | |
| 2017/0206691 A1 | 7/2017 | Harrises et al. | |
| 2018/0181274 A1* | 6/2018 | Jung | G06F 3/04845 |
| 2018/0314889 A1* | 11/2018 | Fukazawa | G06F 3/038 |
| 2018/0322706 A1 | 11/2018 | Drouin et al. | |
| 2019/0042072 A1* | 2/2019 | Takimoto | G06F 9/451 |
| 2019/0064528 A1* | 2/2019 | Fukazawa | G02B 27/0176 |
| 2020/0105068 A1* | 4/2020 | Panse | G06T 19/006 |
| 2020/0241647 A1 | 7/2020 | Kanda | |

FOREIGN PATENT DOCUMENTS

| | | |
|---|---|---|
| KR | 10-2018-0104051 A | 9/2018 |
| KR | 10-2019-0141777 A | 12/2019 |
| KR | 10-2020-0091256 A | 7/2020 |
| WO | 2018/225149 A1 | 12/2018 |
| WO | 2019/055703 A2 | 3/2019 |
| WO | 2019/133051 A1 | 7/2019 |

* cited by examiner

AUGMENTED REALITY DEVICE AND ELECTRONIC DEVICE INTERACTING WITH AUGMENTED REALITY DEVICE

CROSS-REFERENCE TO RELATED APPLICATION(S)

This application is a continuation application, claiming priority under § 365(c), of an International application No. PCT/KR2022/000991, filed on Jan. 19, 2022, which is based on and claims the benefit of a Korean patent application number 10-2021-0026057, filed on Feb. 26, 2021, in the Korean Intellectual Property Office, the disclosure of which is incorporated by reference herein in its entirety.

BACKGROUND

1. Field

The disclosure relates to an augmented reality device and an electronic device that interacts with the augmented reality device.

2. Description of Related Art

Augmented reality (AR) is technology for overlaying three-dimensional (3D) (or two-dimensional (2D)) virtual images on the real-world image or background and displaying overlaid images. Augmented reality technology which combines the real-world environment with virtual objects enables the user to view the real-world environment, thereby providing a better real-life feel and additional information.

Augmented reality devices may allow images provided through a projector to be incident through a prism to the input grating surface. The user may then view the image passing the output grating surface with his eyes. The user may observe the image together with the real-world environment and identify information about a target object in the environment that he is currently viewing.

The above information is presented as background information only to assist with an understanding of the disclosure. No determination has been made, and no assertion is made, as to whether any of the above might be applicable as prior art with regard to the disclosure.

SUMMARY

A meeting may be conducted using augmented reality devices. In a meeting using augmented reality devices, several meeting participants may each use their respective augmented reality devices in the same meeting space. Each meeting participant's augmented reality device may display shared data for the meeting.

However, since each meeting participant mainly looks at the data displayed on her augmented reality device, eye contact with other meeting participants may be insufficient. Therefore, in a meeting using augmented reality devices, it may be difficult for a meeting participant to effectively interact with other meeting participants.

Aspects of the disclosure are to address at least the above-mentioned problems and/or disadvantages and to provide at least the advantages described below. According to an embodiment, an augmented reality device may display shared data for a meeting in a position with fixed Cartesian coordinates, received from the server.

Additional aspects will be set forth in part in the description which follows and, in part, will be apparent from the description, or may be learned by practice of the presented embodiments.

According to an embodiment, an augmented reality device may comprise a display, at least one sensor, a communication circuit, and at least one processor operatively connected with the display, the at least one sensor, and the communication circuit. The at least one processor may be configured to identify a first user input specifying a shared area for outputting shared content to be output on at least one other augmented reality device, transmit information about the shared area to a server through the communication circuit, based on the first user input, identify whether the shared area and a personal area for outputting personal content overlap, based on information obtained through the at least one sensor, control the display to output the shared content in the shared area and the personal content in the personal area, based on identifying that the shared area and the personal area do not overlap, and control the display to output the shared content in the shared area and the personal content in an area not overlapping the shared area, based on identifying that the shared area and the personal area overlap.

According to an embodiment, an augmented reality device may comprise a display, at least one sensor, a communication circuit, and at least one processor operatively connected with the display, the at least one sensor, and the communication circuit. The at least one processor may be configured to obtain shared content and information indicating a position of a shared area for outputting the shared content, from a server through the communication circuit, identify whether the shared area and a personal area for outputting personal content overlap, based on information obtained through the at least one sensor, control the display to output the shared content in the shared area and the personal content in the personal area, based on identifying that the shared area and the personal area do not overlap, and control the display to output the shared content in the shared area and the personal content in an area not overlapping the shared area, based on identifying that the shared area and the personal area overlap.

According to an embodiment, an electronic device may comprise a communication circuit and at least one processor operatively connected with the communication circuit. The at least one processor may be configured to obtain shared content and information indicating a position of a shared area for outputting the shared content, from a server through the communication circuit, obtain information obtained through at least one sensor of an augmented reality device, from the augmented reality device through the communication circuit, identify whether the shared area and a personal area for outputting personal content overlap, based on the information obtained through the at least one sensor of the augmented reality device, transmit, to the augmented reality device through the communication circuit, display information to allow the augmented reality device to output the shared content in the shared area and output the personal content in the personal area, based on identifying that the shared area and the personal area do not overlap, and transmit, to the augmented reality device through the communication circuit, display information to allow the augmented reality device to output the shared content in the shared area and the personal content in an area not overlapping the shared area, based on identifying that the shared area and the personal area overlap.

According to an embodiment, there may be provided an augmented reality device and an electronic device that interacts with the augmented reality device. According to an embodiment, an augmented reality device may output shared data for a meeting in a position with fixed Cartesian coordinates, received from the server. Accordingly, since the gazes of several meeting participants are focused within a certain range from a position having fixed Cartesian coordinates, a meeting participant may efficiently interact with other meeting participants.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
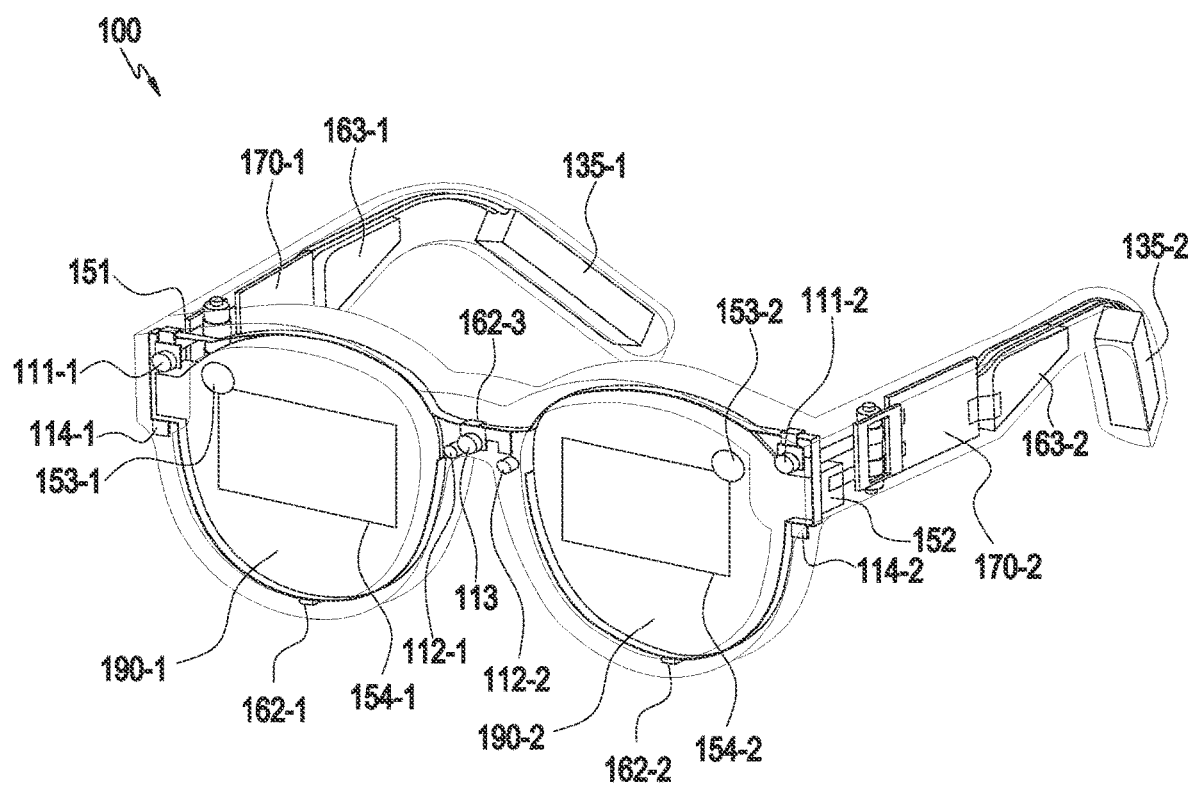
FIG. 1 illustrates a structure of an augmented reality device according to various embodiments.

FIG. 1 illustrates a structure of an augmented reality device according to various embodiments.

According to various embodiments, an augmented reality device 100 may include one or more first cameras 111-1 and 111-2, one or more second cameras 112-1 and 112-2, and one or more third cameras 113. According to various embodiments, an image obtained through the one or more first cameras 111-1 and 111-2 may be used for detection of the user's hand gesture, tracking the user's head, and/or spatial recognition. According to various embodiments, the one or more first cameras 111-1 and 111-2 may be global shutter (GS) cameras. According to various embodiments, the one or more first cameras 111-1 and 111-2 may perform a simultaneous localization and mapping (SLAM) operation through depth capture. According to various embodiments, the one or more first cameras 111-1 and 111-2 may perform spatial recognition for 6DoF.

According to various embodiments, an image obtained through the one or more second cameras 112-1 and 112-2 may be used to detect and track the user's pupil. According to various embodiments, the one or more second cameras 112-1 and 112-2 may be GS cameras. According to various embodiments, the one or more second cameras 112-1 and 112-2 may correspond to the left eye and the right eye, respectively, and the one or more second cameras 112-1 and 112-2 may have the same performance.

According to various embodiments, the one or more third cameras 113 may be high-resolution cameras. According to various embodiments, the one or more third cameras 113 may perform an auto-focusing (AF) function and an image stabilization function. According to various embodiments, the one or more third cameras 113 may be a GS camera or a rolling shutter (RS) camera.

According to various embodiments, the augmented reality device 100 may include one or more light emitting elements 114-1 and 114-2. The light emitting elements 114-1 and 114-2 are different from a light source, which is described below, for irradiating light to a screen output area of the display. According to various embodiments, the light emitting devices 114-1 and 114-2 may irradiate light to facilitate pupil detection in detecting and tracking the user's pupils through the one or more second cameras 112-1 and 112-2. According to various embodiments, each of the light emitting devices 114-1 and 114-2 may include a light emitting diode (LED). According to various embodiments, the light emitting devices 114-1 and 114-2 may irradiate light in an infrared band. According to various embodiments, the light emitting devices 114-1 and 114-2 may be attached around the frame of the augmented reality device 100. According to various embodiments, the light emitting devices 114-1 and 114-2 may be positioned around the one or more first cameras 111-1 and 111-2 and may assist in gesture detection, head tracking, and spatial recognition by the one or more first cameras 111-1 and 111-2 when the augmented reality device 100 is used in a dark environment. According to various embodiments, the light emitting devices 114-1 and 114-2 may be positioned around the one or more third cameras 113 and may assist in obtaining images by the one or more third cameras 113 when the augmented reality device 100 is used in a dark environment.

According to various embodiments, the augmented reality device 100 may include batteries 135-1 and 135-2. The batteries 135-1 and 135-2 may store power for operating the remaining components of the augmented reality device 100.

According to various embodiments, the augmented reality device 100 may include a first display 151, a second display 152, one or more input optical members 153-1 and 153-2, one or more transparent members 190-1 and 190-2, and one or more screen display portions 154-1 and 154-2. According to various embodiments, the first display 151 and the second display 152 may include, e.g., a liquid crystal display (LCD), a digital mirror device (DMD), a liquid crystal on silicon (LCoS), or an organic light emitting diode (OLED), or a micro light emitting diode (micro LED). According to various embodiments, when the first display 151 and the second display 152 are formed of one of a liquid crystal display device, a digital mirror display device, or a silicon liquid crystal display device, the augmented reality device 100 may include a light source for irradiating light to a screen output area of the display. According to various embodiments, when the first display 151 and the second display 152 may generate light on their own, e.g., when formed of either organic light emitting diodes or micro LEDs, the augmented reality device 100 may provide a virtual image of good quality to the user even when a separate light source is not included.

According to various embodiments, the one or more transparent members 190-1 and 190-2 may be disposed to face the user's eyes when the user wears the augmented reality device 100. According to various embodiments, the one or more transparent members 190-1 and 190-2 may include at least one of a glass plate, a plastic plate, or a polymer. According to various embodiments, the user may view the outside world through the one or more transparent members 190-1 and 190-2 when the user wears the augmented reality device 100. According to various embodiments, the one or more input optical members 153-1 and 153-2 may guide the light generated by the first display 151 and the second display 152 to the user's eyes. According to various embodiments, images based on the light generated by the first display 151 and the second display 152 may be formed on one or more screen display portions 154-1 and 154-2 on the one or more transparent members 190-1 and 190-2, and the user may view the images formed on the one or more screen display portions 154-1 and 154-2.

According to various embodiments, the augmented reality device 100 may include one or more optical waveguides (not shown). The optical waveguide may transfer the light generated by the first display 151 and the second display 152 to the user's eyes. The augmented reality device 100 may include one optical waveguide corresponding to each of the left eye and the right eye. According to various embodiments, the optical waveguide may include at least one of glass, plastic, or polymer. According to various embodiments, the optical waveguide may include a nano-pattern formed inside or on one outer surface, e.g., a polygonal or curved grating structure. According to various embodiments, the optical waveguide may include a free-form type prism, and in this case, the optical waveguide may provide incident light to the user through a reflective mirror. According to various embodiments, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to various embodiments, the diffractive element may include input/output optical elements. According to various embodiments, the reflective element may include a member causing total reflection.

According to various embodiments, the augmented reality device 100 may include one or more sound input devices 162-1, 162-2, and 162-3 and one or more sound output devices 163-1 and 163-2.

According to various embodiments, the augmented reality device 100 may include a first PCB 170-1 and a second PCB 170-2. The first PCB 170-1 and the second PCB 170-2 may transfer electrical signals to components included in the augmented reality device 100, such as a first camera 211, a second camera 212, a third camera 213, a display module 250, an audio module 261, and a sensor 280 described below with reference to FIG. 2. According to various embodiments, the first PCB 170-1 and the second PCB 170-2 may be FPCBs. According to various embodiments, the first PCB 170-1 and the second PCB 170-2 each may include a first substrate, a second substrate, and an interposer disposed between the first substrate and the second substrate.

Figure 2:
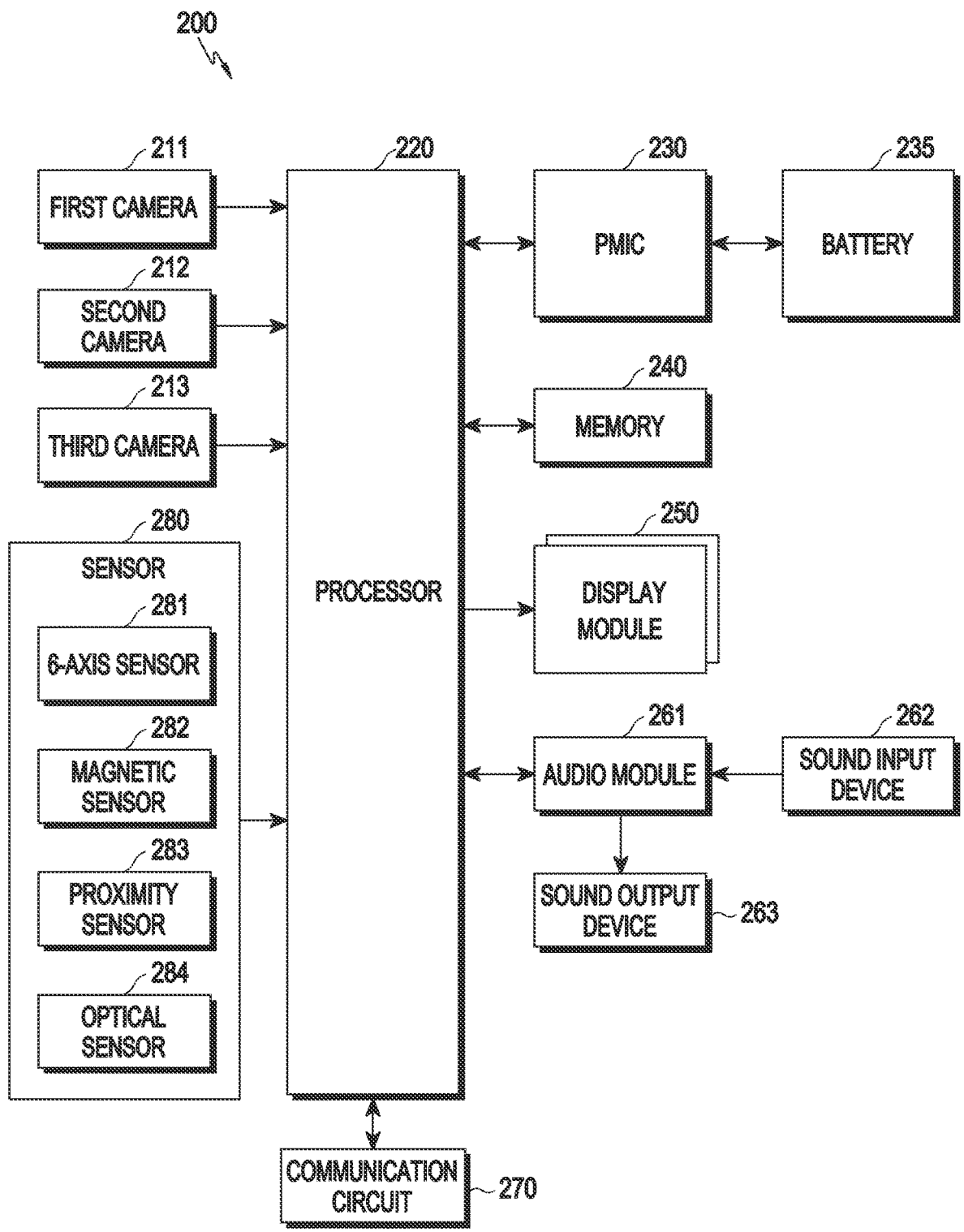
FIG. 2 is a block diagram illustrating an augmented reality device according to various embodiments.

FIG. 2 is a block diagram illustrating an augmented reality device according to various embodiments.

An augmented reality device 200 may include a first camera 211, a second camera 212, a third camera 213, a processor 220, a PMIC 230, a battery 235, a memory 240, a display module 250, an audio module 261, a sound input device 262, a sound output device 263, a communication circuit 270, and a sensor 280.

According to various embodiments, the details of the one or more first cameras 111-1 and 111-2, one or more second cameras 112-1 and 112-2, and one or more third cameras 113 described above in connection with FIG. 1 may be equally applied to the first camera 211, the second camera 212, and the third camera 213, respectively. According to various embodiments, the augmented reality device 200 may include at least one of the first camera 211, the second camera 212, and the third camera 213, in plurality.

According to various embodiments, the processor 220 may control the other components of the augmented reality device 200, e.g., the first camera 211, the second camera 212, the third camera 213, the PMIC 230, the memory 240, the display module 250, the audio module 261, the communication circuit 270, and the sensor 280 and may perform various data processing or computations.

According to various embodiments, the PMIC 230 may convert the power stored in the battery 235 to have the current or voltage required by the other components of the augmented reality device 200 and supply it to the other components of the augmented reality device 200.

According to various embodiments, the memory 240 may store various data used by at least one component (e.g., the processor 220 or a sensor 280) of the augmented reality device 200.

According to various embodiments, the display module 250 may display a screen to be provided to the user. According to various embodiments, the display module 250 may include the first display 151, the second display 152, one or more input optical members 153-1 and 153-2, one or more transparent members 190-1 and 190-2, and one or more screen display portions 154-1 and 154-2, which are described above in connection with FIG. 1.

According to various embodiments, the audio module 261 may be connected to the sound input device 262 and the sound output device 263 and may convert the data input through the sound input device 262 and may convert data to be output to the sound output device 263. The sound output device 263 may include a speaker and an amplifier.

According to various embodiments, the communication circuit 270 may support establishment of a wireless communication channel with an electronic device outside the augmented reality device 200 and performing communication through the established communication channel.

According to various embodiments, the sensor 280 may include a 6-axis sensor 281, a magnetic sensor 282, a proximity sensor 283, and/or an optical sensor 284.

Figure 3:
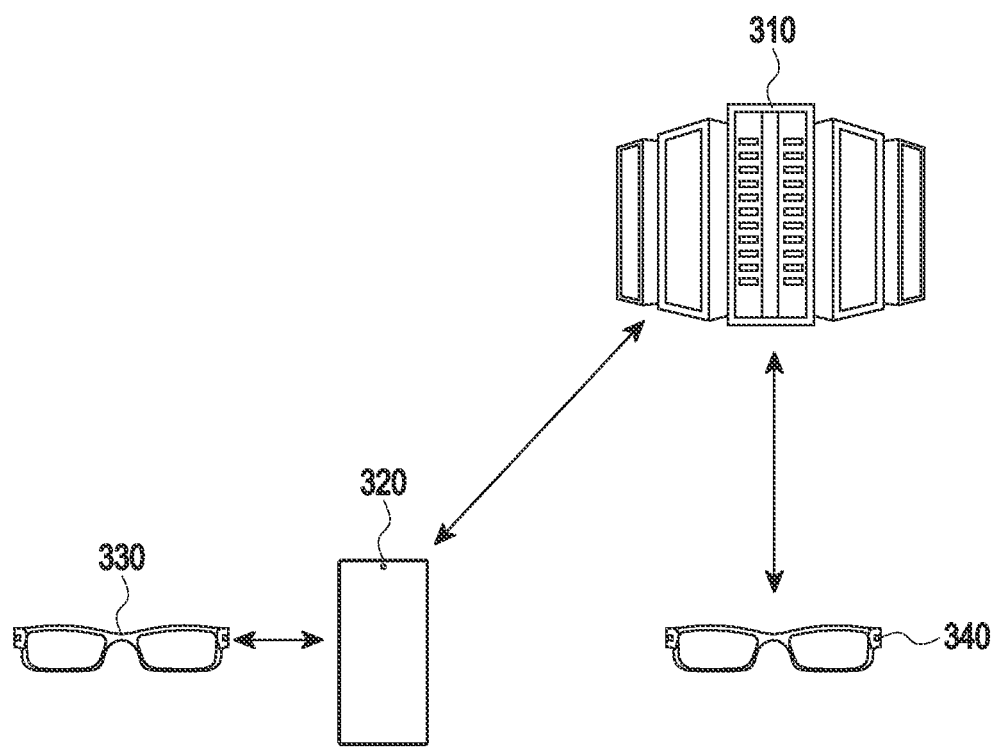
FIG. 3 illustrates an augmented reality device, an electronic device interacting with the augmented reality device, and a server according to various embodiments.

FIG. 3 illustrates an augmented reality device, an electronic device interacting with the augmented reality device, and a server according to various embodiments.

An augmented reality device 330 and an augmented reality device 340 may be devices of meeting participants participating in the same meeting. According to various embodiments, at least one of the augmented reality device 330 and the augmented reality device 340 may have the authority to control a shared area, which is an area in which shared content to be shared in the meeting is displayed. A server 310 may store information about which augmented reality device among the plurality of augmented reality devices 330 and 340 has the authority to control the shared area.

According to various embodiments, the server 310 may perform direct communication with the augmented reality device 340. According to various embodiments, the server 310 may perform communication with an electronic device 320 interacting with the augmented reality device 330. According to various embodiments, the electronic device 320 may perform at least one operation for determining content to be displayed on the augmented reality device 330.

According to various embodiments, the server 310 may receive, from the electronic device 320, at least one of position information about the augmented reality device 330 and information about the space in which the augmented reality device 330 is positioned. According to various embodiments, the server 310 may receive at least one of the position information about the augmented reality device 340 and information about the space in which the augmented reality device 340 is positioned directly from the augmented reality device 340. The server 310 may configure and store a map of the meeting place based on at least one of information obtained from the electronic device 320 and information obtained from the augmented reality device 340.

The server 310 may receive information about content to be shared in the meeting from the electronic device 320 and may transfer it to the augmented reality device 340. In another embodiment, the server 310 may receive information about content to be shared in the meeting from the augmented reality device 340 and may transfer it to the electronic device 320. The information about the content to be shared in the meeting may include at least one of the content to be shared in the meeting and the coordinates of the position where the content to be shared in the meeting is displayed.

According to various embodiments, when the server 310 receives the information about the content to be shared in the meeting from the electronic device 320 and transfers it to the augmented reality device 340, the augmented reality device 340 may display the shared content shared in the meeting. According to various embodiments, the augmented reality device 340 may further display personal content of the augmented reality device 340, which is not shared with the augmented reality devices (e.g., the augmented reality device 330) of the meeting members, while simultaneously displaying the shared content.

According to various embodiments, when the server 310 receives the information about the content to be shared in the meeting from the augmented reality device 340 and transfers it to the electronic device 320, the electronic device 320 may transmit information about content to be displayed on the augmented reality device 330 (hereinafter "display information") to the augmented reality device 330. The display information may include position information about the shared content, which is expressed as coordinates with respect to the augmented reality device 330. According to various embodiments, the display information may include information about the position where the personal content for the user of the augmented reality device 330, not shared with the augmented reality devices of the meeting members, is to be displayed, and which is expressed as coordinates with respect to the augmented reality device 330.

Operations performed on an augmented reality device are mainly described below in connection with FIGS. 5, 8, 9A, 10, 11, 12A, 12B, and 14. However, as shown in FIG. 3, the augmented reality device 330 may exchange information with the server 310 through the electronic device 320 in which case at least some of the operations performed on the augmented reality device 340 directly communicating with the server 310 may be performed on the electronic device 320.

Figure 4:
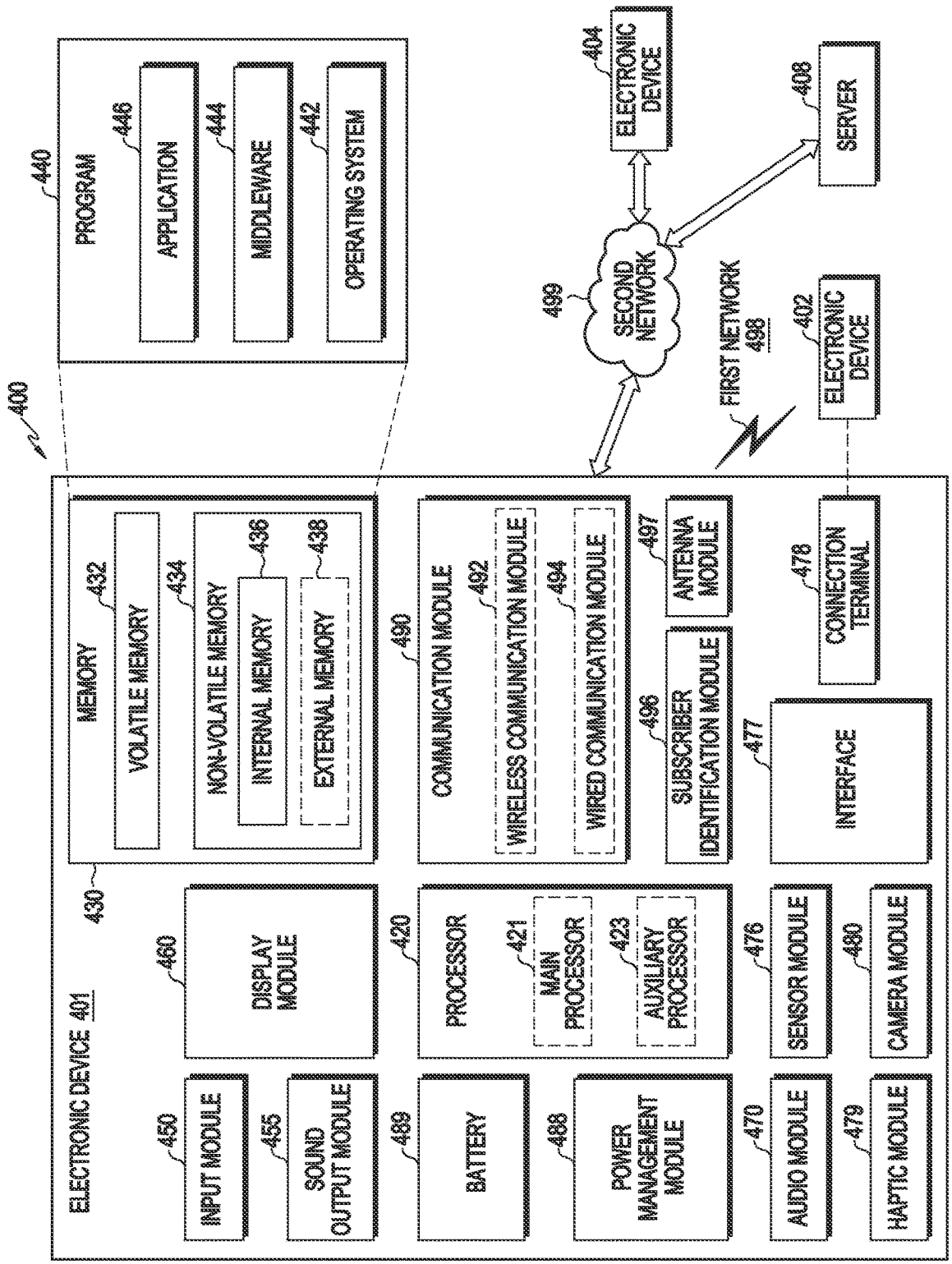
FIG. 4 is a block diagram illustrating an electronic device in a network environment according to various embodiments.

FIG. 4 is a block diagram illustrating an electronic device in a network environment according to various embodiments.

Referring to FIG. 4, an electronic device 401 in a network environment 400 may communicate with an external electronic device 402 via a first network 498 (e.g., a short-range wireless communication network), or an external electronic device 404 or a server 408 via a second network 499 (e.g., a long-range wireless communication network). According to an embodiment, the electronic device 401 may communicate with the external electronic device 404 via the server 408. According to an embodiment, the electronic device 401 may include a processor 420, a memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In some embodiments, at least one (e.g., the connecting terminal 478) of the components may be omitted from the electronic device 401, or one or more other components may be added in the electronic device 101. According to an embodiment, some (e.g., the sensor module 476, the camera module 480, or the antenna module 497) of the components may be integrated into a single component (e.g., the display module 460). According to an embodiment, an electronic device 401 may include the same components, or perform the same operations, as the augmented reality device 100 of FIG. 1, the augmented reality device 200 of FIG. 2, or the augmented reality device 330 or augmented reality device 340 of FIG. 3.

The processor 420 (e.g., the processor 220 of FIG. 2) may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may store a command or data received from another component (e.g., the sensor module 476 or the communication module 490) in a volatile memory 432, process the command or the data stored in the volatile memory 432, and store resulting data in a non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 401 includes the main processor 421 and the auxiliary processor 423, the auxiliary processor 423 may be configured to use lower power than the main processor 421 or to be specified for a designated function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 123. According to an embodiment, the auxiliary processor 423 (e.g., the neural processing unit) may include a hardware structure specified for artificial intelligence model processing. The artificial intelligence model may be generated via machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 (e.g., the memory 240 of FIG. 2) may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by other component (e.g., the processor 420) of the electronic device 401, from the outside (e.g., a user) of the electronic device 401. The input module 450 may include, for example, a microphone, a mouse, a keyboard, keys (e.g., buttons), or a digital pen (e.g., a stylus pen).

The sound output module 455 (e.g., the audio output device 263) may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 (e.g., the display module 250 of FIG. 2) may visually provide information to the outside (e.g., a user) of the electronic device 401. The display 460 may include, for example, a display, a hologram device, or a projector and control circuitry to control a corresponding one of the display, hologram device, and projector. According to an embodiment, the display 460 may include a touch sensor configured to detect a touch, or a pressure sensor configured to measure the intensity of a force generated by the touch.

The audio module 470 (e.g., the audio module 261 of FIG. 2) may convert a sound into an electrical signal and vice versa. According to an embodiment, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 (e.g., the sensor 280 of FIG. 2) may detect an operational state (e.g., power or temperature) of the electronic device 401 or an environmental state (e.g., a state of a user) external to the electronic device 1301, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the external electronic device 402). According to an embodiment, the connecting terminal 478 may include, for example, a HDMI connector, a USB connector, an SD card connector, or an audio connector (e.g., a headphone connector).

The haptic module 479 may convert an electrical signal into a mechanical stimulus (e.g., a vibration or motion) or electrical stimulus which may be recognized by a user via his tactile sensation or kinesthetic sensation. According to an embodiment, the haptic module 479 may include, for example, a motor, a piezoelectric element, or an electric stimulator.

The camera module 480 (e.g., the first camera 211, the second camera 212 or the third camera 213 of FIG. 2) may capture still images and videos. According to an embodiment, the camera module 480 may include one or more lenses, image sensors, image signal processors, or flashes.

The power management module 488 (e.g., the PMIC 230 of FIG. 2) may manage power supplied to the electronic device 401. According to one embodiment, the power management module 488 may be implemented as at least part of, for example, a power management integrated circuit (PMIC).

The battery 489 (e.g., the battery 235 of FIG. 2) may supply power to at least one component of the electronic device 401. According to an embodiment, the battery 489 may include, for example, a primary cell which is not rechargeable, a secondary cell which is rechargeable, or a fuel cell.

The communication module 490 (e.g., the communication circuit 270 of FIG. 2) may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via a first network 498 (e.g., a short-range communication network, such as Bluetooth™, wireless-fidelity (Wi-Fi) direct, or infrared data association (IrDA)) or a second network 499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497. According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

These various types of communication modules may be implemented as a single component (e.g., a single chip), or may be implemented as multi components (e.g., multi chips)

separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497. According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. The external electronic devices 402 or 404 each may be a device of the same or a different type from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In another embodiment, the external electronic device 404 may include an internet-of-things (IoT) device. The server 408 may be an intelligent server using machine learning and/or a neural network. According to an embodiment, the server 408 may include the same components, or perform the same operations, as the server 310 of FIG. 3. According to an embodiment, the external electronic device 404 or the server 408 may be included in the second network 499. The electronic device 401 may be applied to intelligent services (e.g., smart home, smart city, smart car, or healthcare) based on 5G communication technology or IoT-related technology.

Figure 5:
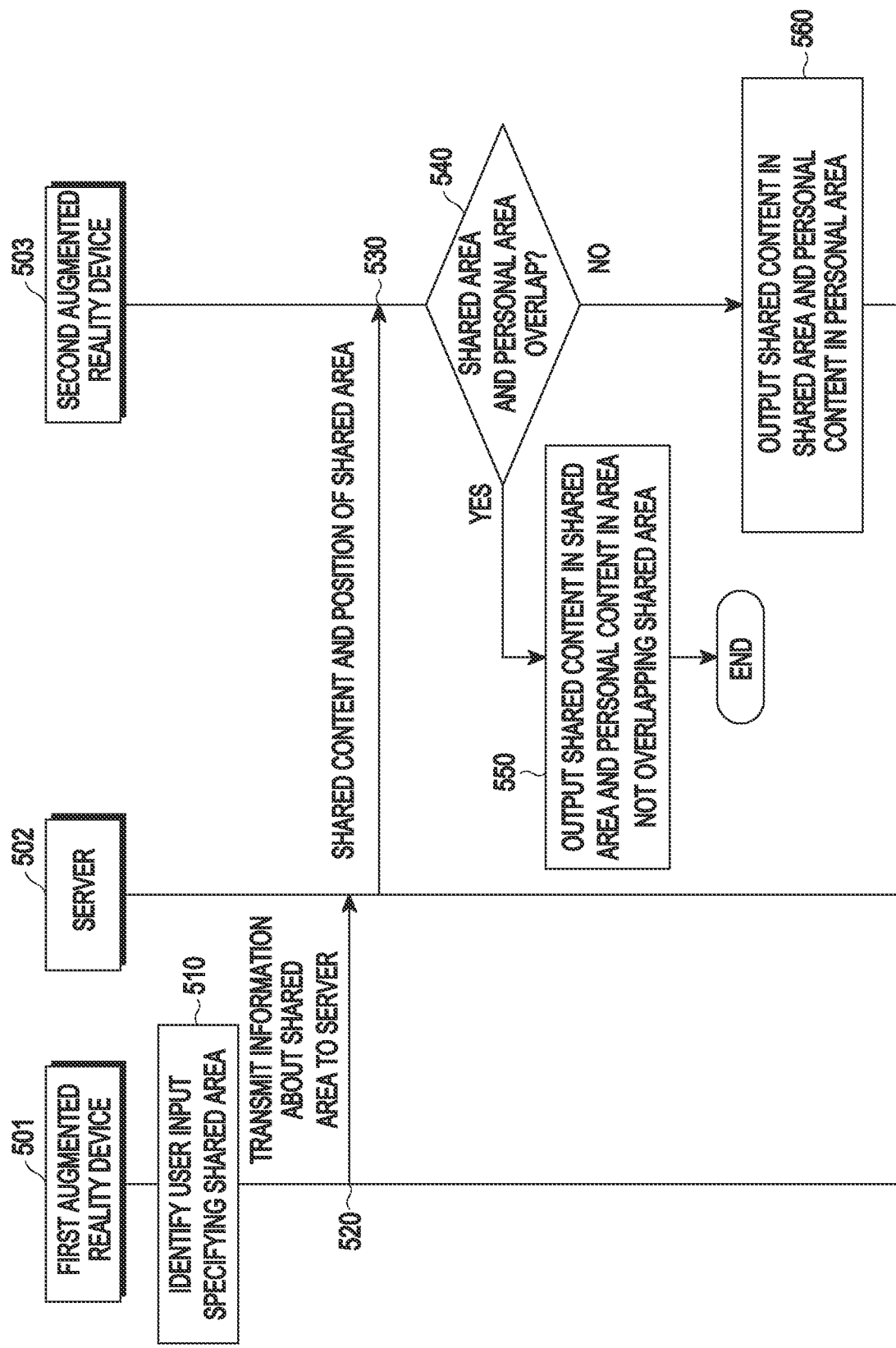
FIG. 5 illustrates operations of augmented reality devices and a server according to various embodiments.

FIG. 5 illustrates operations of augmented reality devices and a server according to various embodiments.

In FIG. 5, a first augmented reality device 501 may be a device authorized to control the shared area. For example, the first augmented reality device 501 may be a device used by a meeting host, and the second augmented reality device 503 may be a device used by a meeting participant.

In operation 510, the first augmented reality device 501 (e.g., the processor 220 of the augmented reality device 200) may identify a user input specifying a shared area. According to various embodiments, the user input may be an input through a controller connected to the first augmented reality device 501. According to various embodiments, the user input may be identified by tracking the gaze of the user of the first augmented reality device 501 based on an image obtained through at least one camera (e.g., the second camera 212) of the first augmented reality device 501. According to various embodiments, the user input may be identified by detecting the gesture of the user of the first augmented reality device 501 based on an image obtained through at least one camera (e.g., the first camera 211) of the first augmented reality device 501.

In operation 520, the first augmented reality device 501 (e.g., the processor 220 of the augmented reality device 200) may transmit information about the shared area to a server 502 through a communication circuit (e.g., the communication circuit 270). According to various embodiments, the information about the shared area may indicate at least one of shared content to be shared with another augmented reality device (e.g., the second augmented reality device 503) or the position of the shared area.

According to various embodiments, the position of the shared area transmitted from the first augmented reality device 501 to the server 502 may be expressed as server reference coordinates with respect to a reference point set by the server 502. According to various embodiments, the position of the shared area transmitted from the first augmented reality device 501 to the server 502 may be expressed as coordinates with respect to the first augmented reality device 501. In this case, the first augmented reality device 501 may transmit, to the server 502, space information and/or position information about the first augmented reality device 501, identified through SLAM technology, and the server 502 may convert the position of the shared area, which is expressed as coordinates with respect to the first augmented reality device 501 and received from the first augmented reality device 501, into the server reference coordinates, based on the space information and/or position information about the first augmented reality device 501.

In operation 530, the server 502 may transmit the shared content and/or the position of the shared area to the second augmented reality device 503. According to various embodiments, the position of the shared area transmitted from the server 502 to the second augmented reality device 503 may be expressed as the server reference coordinates. In this case, the second augmented reality device 503 may convert the position of the shared area expressed as the server reference coordinates into coordinates with respect to the second augmented reality device 503, based on at least one of the position information and/or space information about the second augmented reality device 503.

According to various embodiments, the position of the shared area transmitted from the server 502 to the second augmented reality device 503 may be expressed as coordinates with respect to the second augmented reality device 503. In this case, before performing operation 530, the server 502 may receive at least one of the position information and/or space information about the second augmented reality device 503 from the second augmented reality device 503, identify the position of the shared area expressed as the coordinates with respect to the second augmented reality device 503 based on at least one of the position information and/or space information about the second augmented reality device 503, and transmit it to the second augmented reality device 503.

According to various embodiments, the server 502 may generate shared content in the form of a virtual content, based on the shared content received from the first augmented reality device 501. For example, the server 502 may generate a virtual object for data, such as an image or text received from the first augmented reality device 501 and transmit it to the second augmented reality device 503.

In operation 540, the second augmented reality device 503 (e.g., the processor 220) may identify whether the shared area and the personal area overlap based on the position of the shared area received in operation 530.

According to various embodiments, the personal area of the second augmented reality device 503 may be an area for displaying content not shared with other meeting participants, preset by the second augmented reality device 503.

According to various embodiments, the second augmented reality device 503 (e.g., the processor 220) may perform operation 540 in response to receiving the position of the shared area according to operation 530 while displaying the content not shared with the other meeting participants. In this case, the content not shared with other meeting participants may be defined as personal content, and the area where the personal content may be defined as a personal area.

According to various embodiments, while displaying the shared content in the shared area after receiving the position of the shared area according to operation 530, the second augmented reality device 503 (e.g., the processor 220) may perform operation 540 in response to identifying an input for displaying the content not shared with other meeting participants. In this case, the content not shared with other meeting participants may be defined as personal content, and the area for displaying the personal content may be defined as a personal area.

According to various embodiments, the personal area of the second augmented reality device 503 may be specified by an input through a controller connected with the second augmented reality device 503. According to various embodiments, the personal area of the second augmented reality device 503 may be identified by tracking the gaze of the user of the second augmented reality device 503 based on an image obtained through at least one camera (e.g., the second camera 212) of the second augmented reality device 503. According to various embodiments, the personal area of the second augmented reality device 503 may be identified by detecting the gesture of the user of the second augmented reality device 503 based on an image obtained through at least one camera (e.g., the first camera 211) of the second augmented reality device 503. According to various embodiments, the personal area of the second augmented reality device 503 may be designated as an arbitrary display area without a separate user input. According to various embodiments, the personal area of the second augmented reality device 503 may have a position set as default, without a separate user input. For example, the position set as default may be determined by the system of the second augmented reality device 503 or may be set by the user.

According to various embodiments, that the shared area and the personal area overlap may mean that there is an area belonging to both the shared area and the personal area without being limited to when the boundary specifying the shared area and the boundary specifying the personal area completely overlap each other.

According to various embodiments, the shared area may be displayed in a world lock scheme on the second augmented reality device 503. For example, the world lock scheme may mean that the position of the shared area is fixed when expressed as the server reference coordinates or Cartesian coordinates with respect to the reference point set by the server 502.

According to various embodiments, the personal area in the second augmented reality device 503 may be displayed in the world lock scheme like the shared area. According to various embodiments, the personal area may be displayed in a body lock scheme on the second augmented reality device 503. For example, the body lock scheme may mean that the position of the personal area is fixed when expressed as coordinates with respect to the second augmented reality device 503. In other words, the position of the personal area may be fixed within the field of view (FOV) of the user (or the camera (e.g., the first camera 211 or the second camera 212)) of the second augmented reality device 503.

Although not shown in FIG. 5, according to various embodiments, after performing operation 520, the first augmented reality device 501 (e.g., the processor of the augmented reality device 200) may identify an input for displaying the personal content in the personal area while displaying the shared content in the shared area or perform operations 510 and 520 while displaying the personal content. According to various embodiments, the first augmented reality device 501 (e.g., the processor 220 of the augmented reality device 200) may identify whether the personal area where the personal content is displayed and the shared area overlap, based on the information obtained through at least one sensor 280.

According to various embodiments, the personal area may be an area for displaying personal content which is content displayed only on the first augmented reality device 501 and not displayed on the augmented reality devices of other meeting participants.

According to various embodiments, when an input for displaying personal content in the personal area is identified while displaying the shared content in the shared area, the personal area, as an area for displaying personal content, may be specified by the user or set as default.

According to various embodiments, while the first augmented reality device 501 (e.g., the processor 220 of the augmented reality device 200) performs operations 510 and 520 while displaying personal content, the personal area may mean an area that the personal content used to be displayed.

Details of the personal area of the first augmented reality device 501 are identical to the details of the personal area of the second augmented reality device 503, described above in connection with operation 540.

Based on identifying that the shared area and the personal area do not overlap, the first augmented reality device 501 (e.g., the processor 220 of the augmented reality device 200) may control the display (e.g., the display module 250) to display the shared content in the shared area and the personal content in the personal area.

Based on identifying that the shared area and the personal area overlap, the first augmented reality device 501 (e.g., the processor 220 of the augmented reality device 200) may control the display (e.g., the display module 250) to display the shared content in the shared area and the personal content in an area not overlapping the shared area.

Figure 6A:
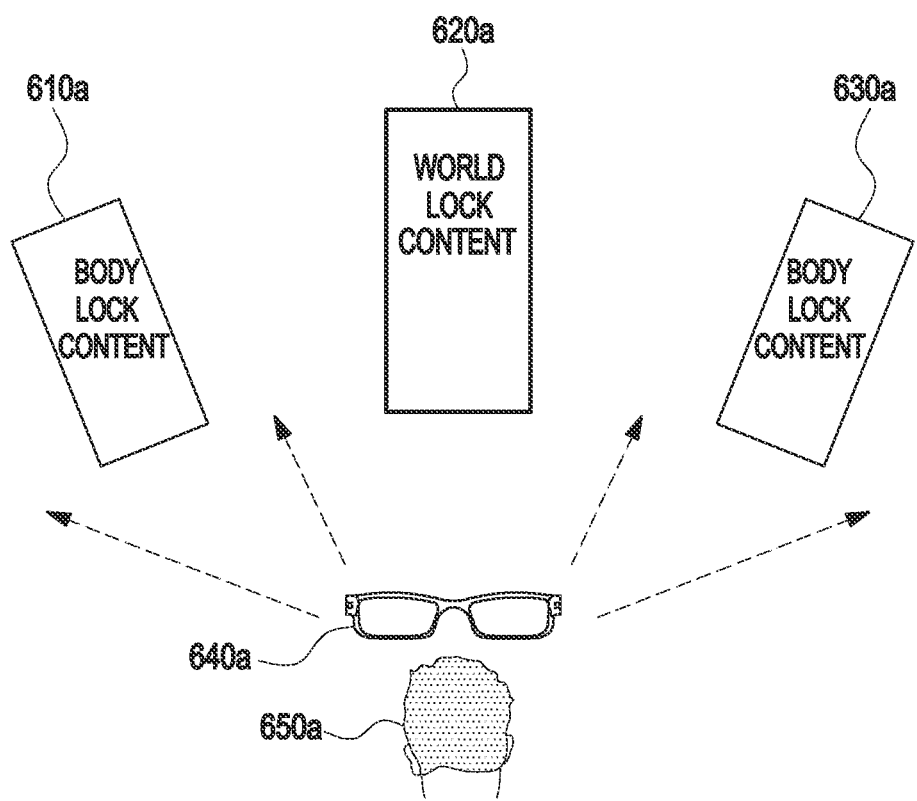
FIG. 6A illustrates an example of outputting body lock content and world lock content according to various embodiments.
Figure 6B:
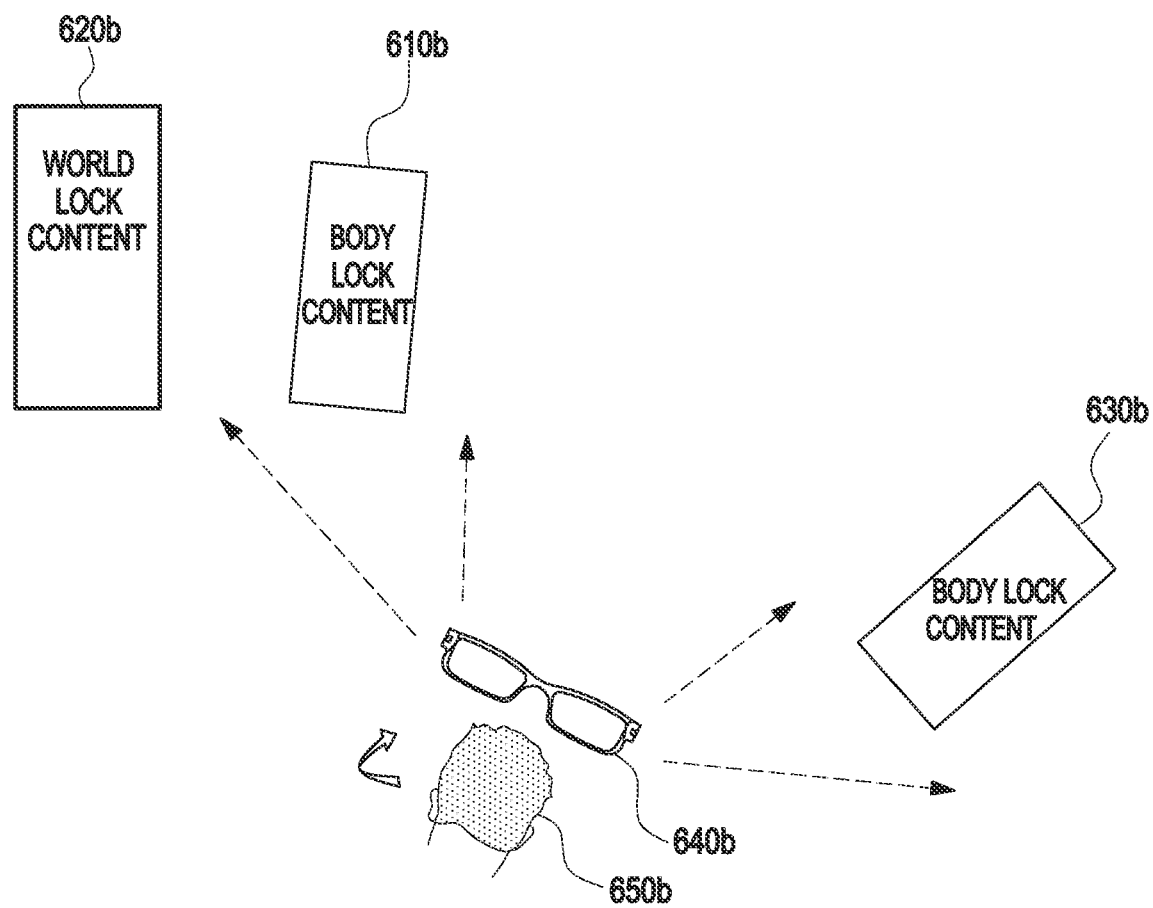
FIG. 6B illustrates an example of outputting body lock content and world lock content according to various embodiments.

To describe the world lock scheme and the body lock scheme, reference may be made to FIGS. 6A and 6B.

FIGS. 6A and 6B illustrate an example of displaying body lock content and world lock content according to various embodiments.

Referring to FIG. 6A, body lock contents 610a and 630a and a world lock content 620a may be displayed within the FOV of the user 650a of the augmented reality device 640a. For example, the FOV of the user 650a of the augmented reality device 640a may mean an area that the user 650a may identify through the augmented reality device 640a and may substantially coincide with or be contained within the FOV of a camera (e.g., the first camera 211 or second camera 212).

FIG. 6B illustrates a case in which the user 650b turns her head to the right. As the user 650b turns her head to the right as compared with FIG. 6A, the FOV of the user 650b of the augmented reality device 640b may rotate to the right area as compared to FIG. 6A. The body lock contents 610b and 630b may be displayed in constant positions within the FOV of the user 650b. In other words, when expressed as coordinates with respect to the augmented reality device 640b, the positions of the body lock contents 610b and 630b may be the same as the positions of the body lock contents 610a and 630a of FIG. 6A. When expressed as server reference coordinates or Cartesian coordinates, the position of the world lock content 620b may be constant. For example, the world lock content 620b may not be positioned within the FOV of the user 650b based on the direction in which the user 650b or the augmented reality device 640b faces.

Figure 7A:
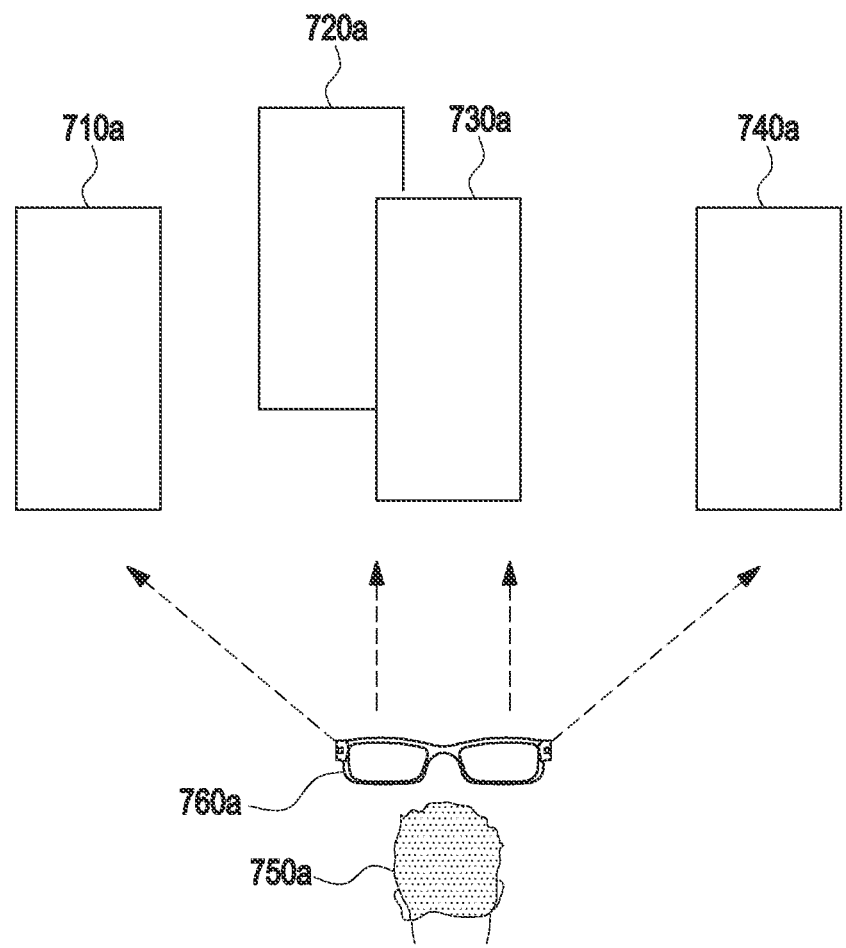
FIG. 7A illustrates an example of outputting shared content and personal content according to various embodiments.

FIG. 7A illustrates an example in which the shared area and the personal area are identified as overlapping in operation 540.

Referring to FIG. 7A, a user 750a may identify an area through the augmented reality device 760a and the augmented reality device 760a may define a plurality of personal areas 710a, 720a, and 740a and a shared area 730a. The personal area 720a and the shared area 730a may partially overlap.

When it is identified that the shared area and the personal area overlap in operation 540, the second augmented reality device 503 (e.g., the processor 220) may display the shared content in the shared area and personal content in an area that does not overlap the shared area, in operation 550. For example, an area in which personal content is displayed may be included in an area other than the shared area in the FOV. Further, the personal area may be an area in which personal content is displayed.

Figure 7B:
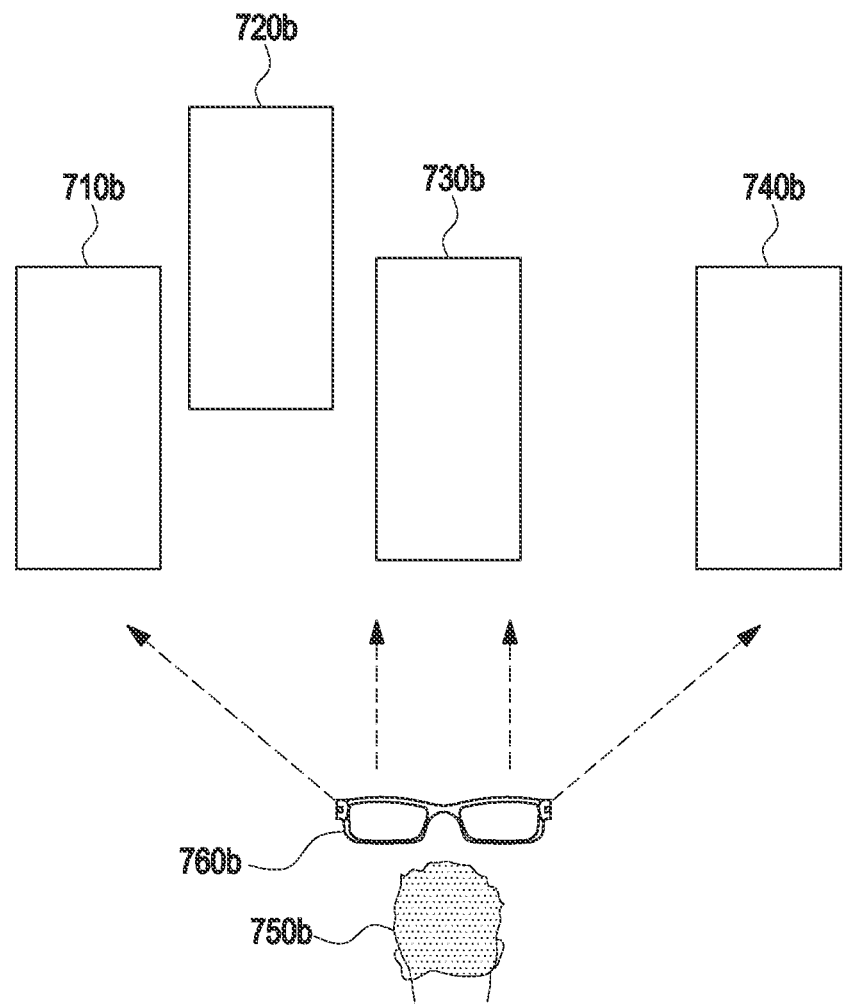
FIG. 7B illustrates an example of outputting shared content and personal content according to various embodiments.

FIG. 7B illustrates an example of displaying shared content and personal content according to various embodiments. FIG. 7B illustrates an example in which a shared area and a personal area are displayed according to operation 550.

Referring to FIG. 7B, a user 750b may identify an area through the augmented reality device 760b and a personal area 710 displayed on an augmented reality device 760b is identical in position to a personal area 710a, a personal area 740b is identical in position to a personal area 740a, and a shared area 730b is identical in position to a shared area 730a. The position of a personal area 720a overlapping the shared area 730a may be changed according to operation 550 so that a personal area 720b may be displayed in a position not overlapping a shared area 730b.

As described above in connection with FIG. 3, at least some of the operations of the second augmented reality device 503 (e.g., the augmented reality device 640a or the augmented reality device 640b) may be performed on an electronic device (e.g., the electronic device 320 of FIG. 3) connected to the second augmented reality device 503. In this case, at least one processor of the electronic device may obtain shared content from the server 502 and information indicating the position of the shared area for outputting the shared content, obtain information about the personal area from the second augmented reality device 503, obtain at least one of position information and/or space information obtained through at least one sensor of the second augmented reality device 503 from the second augmented reality device 503, identify whether the shared area and the personal area overlap based on at least one of the position information and/or the space information, transmit, to the second augmented reality device 503, display information to allow the second augmented reality device 503 to output the shared content in the shared area and the personal content in the personal area in response to identifying that the shared area and the personal area do not overlap, and transmit, to the second augmented reality device 503, display information to allow the second augmented reality device 503 to output the shared content in the shared area and the personal content in an area different from the personal area and not overlapping the shared area in response to identifying that the shared area and the personal area overlap. The second augmented reality device 503 may output a screen based on the display information received from the electronic device. According to an embodiment, when the position information and/or space information obtained through at least one sensor of the second augmented reality device 503 is changed, or periodically, the second augmented reality device 503 may transmit position information and/or space information to the electronic device (e.g., the electronic device 320 of FIG. 3) connected with the second augmented reality device 503 and receive, from the electronic device, and output display information.

As described above in connection with FIG. 3, at least some of the operations of the first augmented reality device 501 may be performed on the electronic device connected with the first augmented reality device 501. In this case, the electronic device connected with the first augmented reality device 501 may receive information about a user input through communication from the first augmented reality device 501 or identify a user input made as an input to the electronic device and transmit information about the shared area to the server 502 based on the user input.

Figure 8:
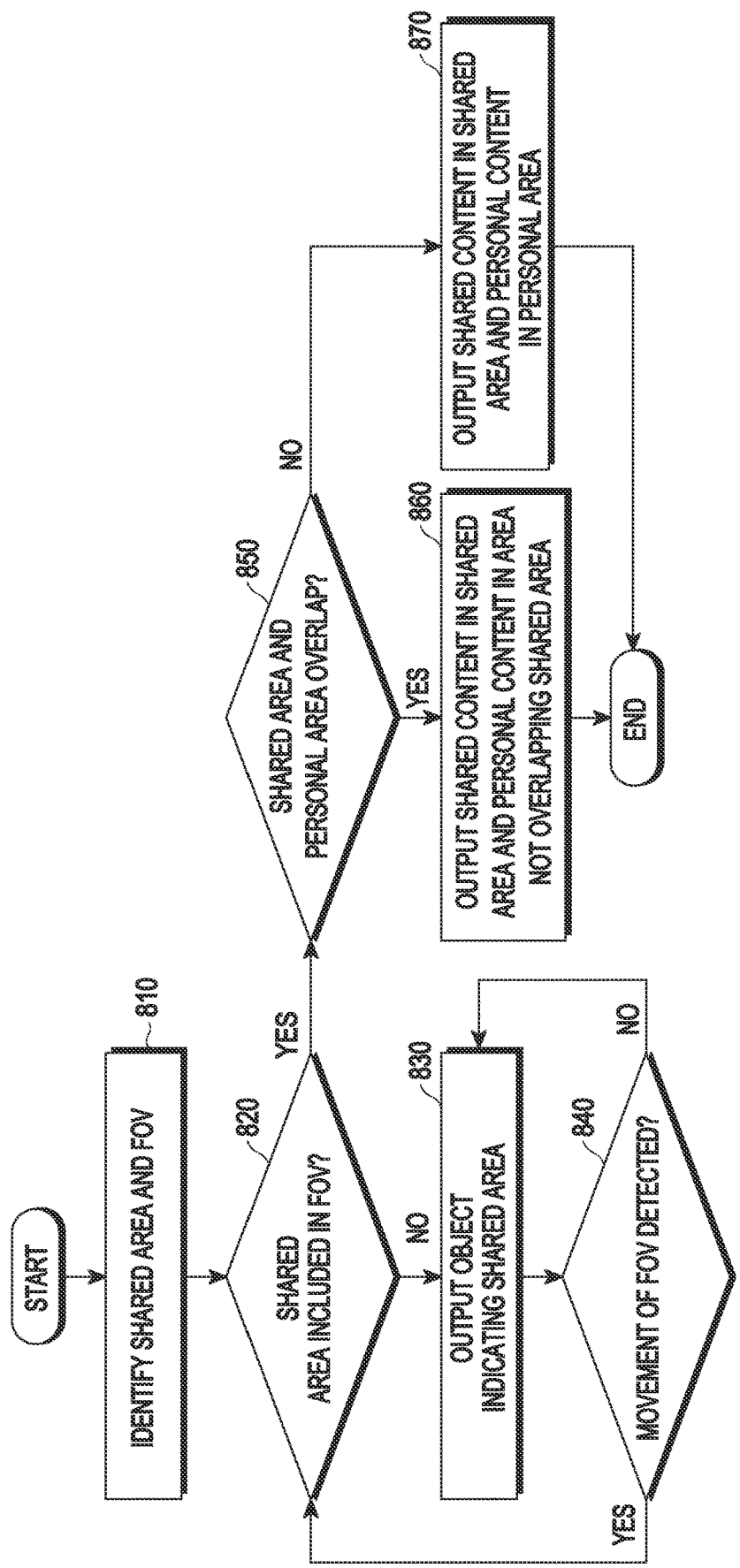
FIG. 8 is a flowchart illustrating operations performed in an augmented reality device according to various embodiments.

FIG. 8 is a flowchart illustrating operations performed in an augmented reality device according to various embodiments.

In operation 810, at least one processor (e.g., the processor 220) of the augmented reality device (e.g., the augmented reality device 200) may identify the shared area and the FOV of the user of the augmented reality device 200. According to various embodiments, the at least one processor 220 may identify the shared area based on a user input. As described above with reference to operation 510 of FIG. 5, the user input may be at least one of an input through a controller, an input identified through eye tracking, or a gesture input. In this case, the augmented reality device 200 may have the authority to control the shared area.

According to various embodiments, the at least one processor 220 may identify the shared area based on information received from the server. In this case, the augmented reality device 200 may not have the authority to control the shared area. The information received from the server may indicate a shared area specified by another augmented reality device having the authority to control the shared area.

According to various embodiments, the at least one processor 220 may identify the FOV based on the image obtained through at least one of a first camera (e.g., the first camera 211) or a second camera (e.g., the second camera 212).

In operation 820, at least one processor (e.g., processor 220) of the augmented reality device (e.g., the augmented reality device 200) may identify whether the shared area is included in the field of view (FOV). According to various embodiments, the at least one processor 220 may identify that the shared area is included in the FOV only when the entire shared area is included in the FOV. According to various embodiments, the at least one processor 220 may identify that the shared area is included in the FOV when at least a portion of the shared area is included in the FOV.

When it is identified that the shared area is not included in the FOV in operation 820, at least one processor (e.g., the processor 220) of the augmented reality device (e.g., the augmented reality device 200) may display an object indicating the shared area in operation 830. According to various embodiments, the object indicating the shared area may indicate a relative position of the shared area with respect to the FOV. According to various embodiments, the object indicating the shared area may be an arrow-shaped indicator. According to various embodiments, the object indicating the shared area may be a message indicating a relative position of the shared area with respect to the FOV. According to various embodiments, instead of operation 830, at least one processor (e.g., processor 220) of the augmented reality device (e.g., the augmented reality device 200) may output, through the sound output device (e.g., the sound output device 263), an audio indicating the relative position of the shared area with respect to the FOV.

In operation 840, at least one processor (e.g., the processor 220) of the augmented reality device (e.g., the augmented reality device 200) may identify whether a movement (or change) of the FOV is detected. According to various embodiments, the at least one processor 220 may identify whether a movement of the FOV is detected, based on information obtained through at least one of the first camera 211, the second camera 212, or the six-axis sensor 281.

If a movement of the FOV is not detected in operation 840, at least one processor (e.g., the processor 220) of the augmented reality device (e.g., the augmented reality device 200) may repeat operations 830 and 840 until a movement of the FOV is detected. According to an embodiment, when a movement of the FOV is not detected within a designated time, the augmented reality device may stop displaying the object indicating the shared area.

When a movement of the FOV is detected in operation 840, at least one processor (e.g., the processor 220) of the augmented reality device (e.g., the augmented reality device 200) may return to operation 820.

When it is identified that the shared area is included in the FOV in operation 820, at least one processor (e.g., the processor 220) of the augmented reality device (e.g., the augmented reality device 200) may identify whether the shared area and the personal area overlap in operation 850. Details regarding operation 540 of FIG. 5 may be equally applied to operation 850.

When it is identified that the shared area and the personal area overlap in operation 850, the at least one processor (e.g., the processor 220) of the augmented reality device (e.g., the augmented reality device 200) may output the shared content in the shared area and personal content in an area that does not overlap the shared area, in operation 860. For example, an area different from the private area may include an area other than the shared area within the FOV. Details regarding operation 550 of FIG. 5 may be equally applied to operation 860.

When it is identified that the shared area and the personal area do not overlap in operation 850, the at least one processor (e.g., the processor 220) of the augmented reality device (e.g., the augmented reality device 200) may output the shared content in the shared area and personal content in the personal area, in operation 870. Details regarding operation 560 of FIG. 5 may be equally applied to operation 870.

As described above in connection with FIG. 3, at least some of the operations of FIG. 8 may be performed on an electronic device (e.g., the electronic device 401) connected with the augmented reality device 200. For example, outputting in operations 860 and 870 when operations 860 and 870 are performed by the electronic device 401 connected with the augmented reality device 200 may be replaced with transmitting display information for outputting content on the augmented reality device 200 through a communication circuit (e.g., the communication module 490), rather than outputting content on the display (e.g., the display module 460) of the electronic device 401 connected with the augmented reality device 200. In this case, the augmented reality device 200 obtaining the display information from the electronic device 401 may output the content on the display (e.g., the display module 250) based on the display information. When at least some of the operations of FIG. 8 are performed on the electronic device (e.g., the electronic device 401) connected with the augmented reality device 200, the electronic device 401 may be aware of the display information output on the augmented reality device 200 and the space information and/or position information about the augmented reality device 200. For example, the electronic device 401 may obtain space information and/or position information about the augmented reality device 200 from the augmented reality device 200, identify the FOV based on the space information and/or position information about the augmented reality device 200, perform at least one of operations 820, 840, or 850 periodically or when the space information and/or position information is changed, and transmit, to the augmented reality device 200, display information to allow the augmented reality device 200 to output the shared content and the personal content.

Figure 9A:
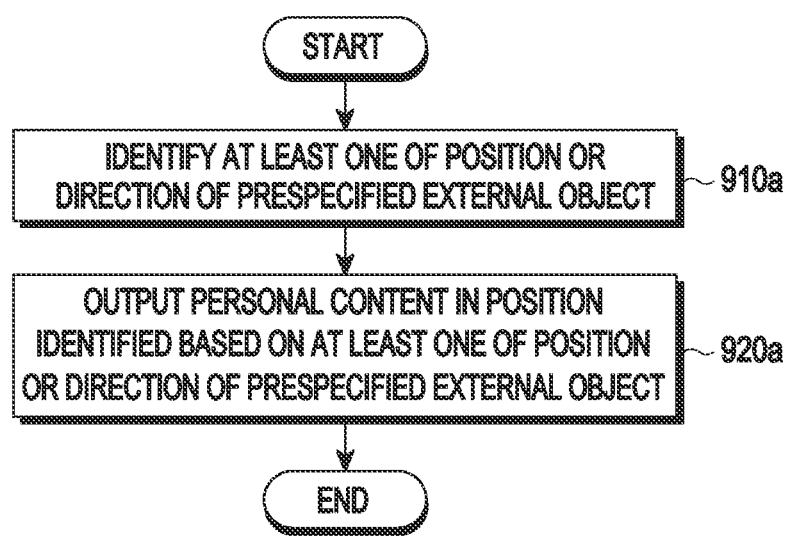
FIG. 9A is a flowchart illustrating operations performed in an augmented reality device according to various embodiments.

FIG. 9A is a flowchart illustrating operations performed in an augmented reality device according to various embodiments.

In operation 910a, at least one processor (e.g., processor 220) of the augmented reality device (e.g., the augmented reality device 200) may identify at least one of the position or direction of a predefined external object. According to various embodiments, the predefined external object may be at least one of a portion of a human body, such as a human head, an animal, or a thing, such as a bag.

According to various embodiments, the at least one processor 220 may analyze an image obtained through the first camera (e.g., the first camera 211), thereby identifying the position of the predefined external object included in the image. In this case, the memory (e.g., the memory 240) of the augmented reality device 200 may store data regarding the predefined external object and commands for identifying the position of the external object from the image.

According to various embodiments, the at least one processor 220 may transmit the image obtained through the first camera 211 to the electronic device (e.g., the electronic device 401) and may receive the position of the predefined external object included in the image from the electronic device 401 to thereby identify the position of the predefined external object. In this case, the memory (e.g., the memory 430) of the electronic device 401 may store data regarding the predefined external object and commands for identifying the position of the external object from the image.

According to various embodiments, the at least one processor 220 may transmit the image obtained through the first camera 211 to the server (e.g., the server 310) and receive the position of the predefined external object included in the image from the server 310 to thereby identify the position of the predefined external object. In this case, the server 310 may store data regarding the predefined external object and commands for identifying the position of the external object from the image.

According to various embodiments, the at least one processor 220 may analyze an image obtained through the first camera (e.g., the first camera 211), thereby identifying the direction of the predefined external object included in the image. In this case, the memory (e.g., the memory 240) of the augmented reality device 200 may store data regarding the predefined external object and commands for identifying the direction of the external object from the image.

According to various embodiments, the at least one processor 220 may transmit the image obtained through the first camera 211 to the electronic device (e.g., the electronic device 401) and may receive the direction of the predefined external object included in the image from the electronic device 401 to thereby identify the direction of the predefined external object. In this case, the memory (e.g., the memory 430) of the electronic device 401 may store data regarding the predefined external object and commands for identifying the direction of the external object from the image.

According to various embodiments, the at least one processor 220 may transmit the image obtained through the first camera 211 to the server (e.g., the server 310) and receive the direction of the predefined external object included in the image from the server 310 to thereby identify the direction of the predefined external object. In this case, the server 310 may store data regarding the predefined external object and commands for identifying the direction of the external object from the image.

In operation 920a, at least one processor (e.g., processor 220) of the augmented reality device (e.g., the augmented reality device 200) may output personal content in the position identified based on at least one of the position or direction of the prespecified external object.

According to various embodiments, when the position of the predefined external object overlaps the personal area, and the direction of the predefined external object is a direction in which it may meet the gaze of the user of the augmented reality device (e.g., the augmented reality device 200), the at least one processor (e.g., the processor 220) of the augmented reality device (e.g., the augmented reality device 200) may output the personal content in an area not overlapping the position of the external object, different from the existing personal area, thereby allowing the user of the augmented reality device (e.g., the augmented reality device 200) to avoid eye contact with the person corresponding to the external object.

According to various embodiments, when the position of the predefined external object overlaps the personal area but the direction of the predefined external object is a direction in which it may not meet the gaze (e.g., FOV) of the user of the augmented reality device (e.g., the augmented reality device 200), the at least one processor (e.g., the processor 220) of the augmented reality device (e.g., the augmented reality device 200) may output the personal content in the existing personal area. For example, when the predefined external object is a human head, and the back of the human head faces the augmented reality device (e.g., the augmented reality device 200), the augmented reality device (e.g., the augmented reality device 200) may output the personal content in the existing personal area.

As described above in connection with FIG. 3, at least some of the operations of FIG. 9A may be performed on an electronic device (e.g., the electronic device 401) connected with the augmented reality device 200. In this case, before performing operation 910a, the electronic device 401 may receive, from the augmented reality device 200, an image obtained through the first camera 211 of the augmented reality device 200 and, in operation 910a, perform image analysis by referring to the memory (e.g., the memory 430) of the electronic device 401 or transmit the image through the communication circuit (e.g., the communication module 490) to the server (e.g., the server 310) and receive a result of image analysis from the server 310 having performed the image analysis. Further, displaying content when operation 920a is performed by the electronic device 401 may be replaced with transmitting display information for displaying content on the augmented reality device 200 through a communication circuit (e.g., the communication circuit 270), rather than displaying content on the display (e.g., the display module 460) of the electronic device 401 connected with the augmented reality device 200. For example, the electronic device 401 may generate display information generated to allow the augmented reality device 200 to display personal content in a position not overlapping the predefined external object and transmit it to the augmented reality device 200. In this case, the augmented reality device 200 receiving the display information from the electronic device 401 may display the content on the display (e.g., the display module 250) based on the display information.

Figure 9B:
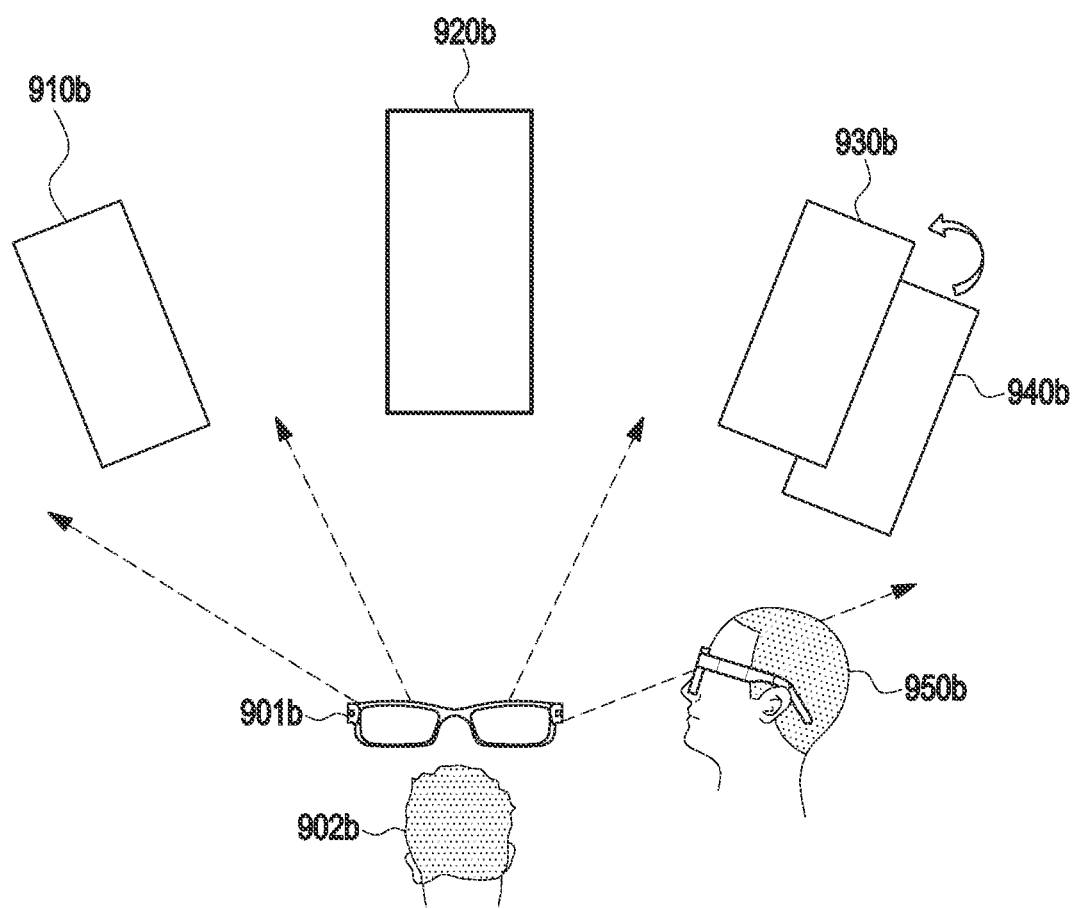
FIG. 9B illustrates an example in which personal content is output on an augmented reality device, according to various embodiments.

FIG. 9B illustrates an example in which personal content is displayed on an augmented reality device, according to various embodiments. More specifically, FIG. 9B illustrates an example of a change in position of personal content when the operations of FIG. 9A are performed.

Referring to FIG. 9B, personal areas 910b and 940b and a shared area 920b may be defined in the FOV. A human face 950b, which is one of types predefined for external objects, may overlap the personal area 940b, and the direction in which the human face 950b faces may be a direction in which it may meet the gaze of the user 902b of the augmented reality device 901b. In this case, at least one processor (e.g., the processor 220) of the augmented reality device 901b (e.g., the augmented reality device 200) may display personal content in the position 930b not overlapping the human face 950b according to operation 920a.

According to an embodiment, personal content configured in a world lock scheme may be displayed in the personal area 940b, and the personal content configured in the world lock scheme may overlap an external object. In this case, the augmented reality device may change the attribute of the personal content configured in the world lock scheme into a body lock scheme and display content in a position 930b not overlapping the external object.

Figure 10:
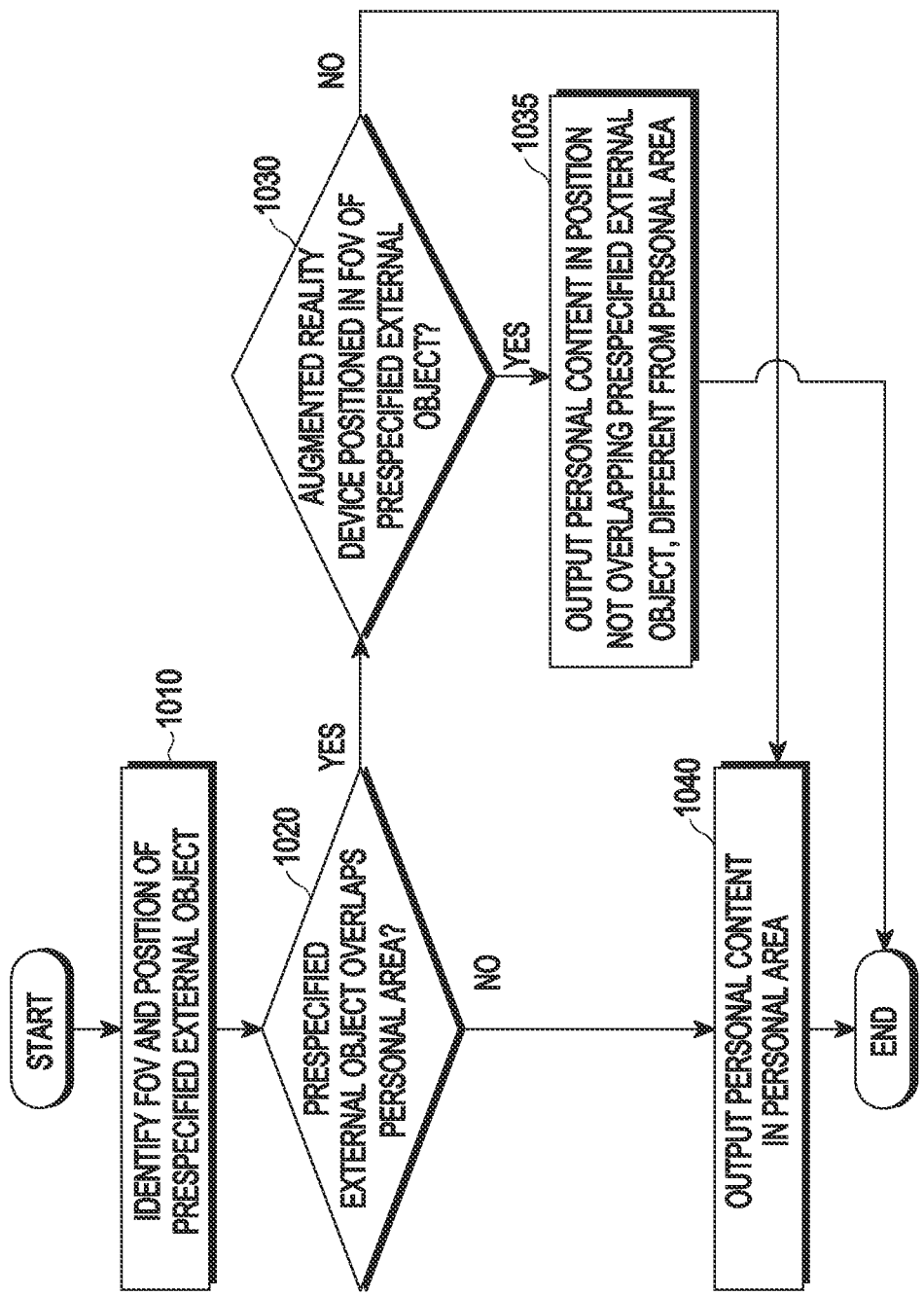
FIG. 10 is a flowchart illustrating operations performed in an augmented reality device according to various embodiments.

FIG. 10 is a flowchart illustrating operations performed in an augmented reality device according to various embodiments.

In operation 1010, at least one processor (e.g., the processor 220) of the augmented reality device (e.g., the augmented reality device 200) may identify the position of a predefined external object and the FOV of the external object. According to various embodiments, the predefined external object may be an object that may have a gaze, such as a human head or a camera.

The example described above in connection with operation 910a of FIG. 9A may be applied to the method for the at least one processor 220 to grasp the position of the external object in operation 1010.

According to various embodiments, the at least one processor 220 may analyze an image obtained through the first camera (e.g., the first camera 211), thereby identifying the FOV of the predefined external object included in the image. In this case, the memory (e.g., the memory 240) of the augmented reality device 200 may store data regarding the predefined external object and commands for identifying the FOV of the external object from the image.

According to various embodiments, the at least one processor 220 may transmit the image obtained through the first camera 211 to the electronic device (e.g., the electronic device 401) and may receive the FOV of the predefined external object included in the image from the electronic device 401 to thereby identify the FOV of the predefined external object. In this case, the memory (e.g., the memory 430) of the electronic device 401 may store data regarding the predefined external object and commands for identifying the FOV of the external object from the image.

According to various embodiments the at least one processor 220 may transmit the image obtained through the first camera 211 to the server (e.g., the server 310) and receive the FOV of the predefined external object included in the image from the server 310 to thereby identify the FOV of the predefined external object. In this case, the server 310 may store data regarding the predefined external object and commands for identifying the FOV of the external object from the image.

In operation 1020, the at least one processor (e.g., the processor 220) of the augmented reality device (e.g., the augmented reality device 200) may identify whether the predefined external object overlaps the personal area based on the position of the predefined external object. Here, that the predefined external object overlaps the personal area may mean that at least a portion of the personal area overlaps the external object.

When it is identified that the predefined external object does not overlap the personal area in operation 1020, the at least one processor (e.g., the processor 220) of the augmented reality device (e.g., the augmented reality device 200) may display personal content in the personal area in operation 1040.

When it is identified that the predefined external object overlaps the personal area in operation 1020, the at least one processor (e.g., the processor 220) of the augmented reality device (e.g., the augmented reality device 200) may identify whether the augmented reality device 200 is positioned in the FOV of the external object in operation 1030.

When it is identified that the augmented reality device 200 is positioned in the FOV of the external object in operation 1030, the at least one processor (e.g., the processor 220) of the augmented reality device (e.g., the augmented reality device 200) may display personal content in a position not overlapping the predefined external object, different from the personal area, in operation 1035.

When it is identified that the augmented reality device 200 is not positioned in the FOV of the external object in operation 1030, the at least one processor (e.g., the processor 220) of the augmented reality device (e.g., the augmented reality device 200) may perform operation 1040.

As described above in connection with FIG. 3, at least some of the operations of FIG. 10 may be performed on an electronic device (e.g., the electronic device 401) connected with the augmented reality device 200. In this case, before performing operation 1010, the electronic device 401 may receive, from the augmented reality device 200, an image obtained through the first camera 211 of the augmented reality device 200 and, in operation 1010, perform image analysis by referring to the memory (e.g., the memory 430) of the electronic device 401 or transmit the image through the communication circuit (e.g., the communication module 490) to the server (e.g., the server 310) and receive a result of image analysis from the server 310 having performed the image analysis. Further, displaying content when operations 1035 and 1040 are performed by the electronic device 401 may be replaced with transmitting display information for displaying content on the augmented reality device 200 through a communication circuit (e.g., the communication circuit 270), rather than displaying content on the display (e.g., the display module 460) of the electronic device 401 connected with the augmented reality device 200. For example, when performing operation 1035, the electronic device 401 may generate display information generated to allow the augmented reality device 200 to display personal content in a position not overlapping the predefined external object and transmit it to the augmented reality device 200. In this case, the augmented reality device 200 receiving the display information from the electronic device 401 may display the content on the display (e.g., the display module 250) based on the display information.

According to an embodiment, the personal content configured in the world lock scheme may overlap the external object, and the augmented reality device may be positioned within the FOV of the external object. In this case, the augmented reality device may change the attribute of the personal content configured in the world lock scheme into a body lock scheme and display content in a position not overlapping the external object.

Figure 11:
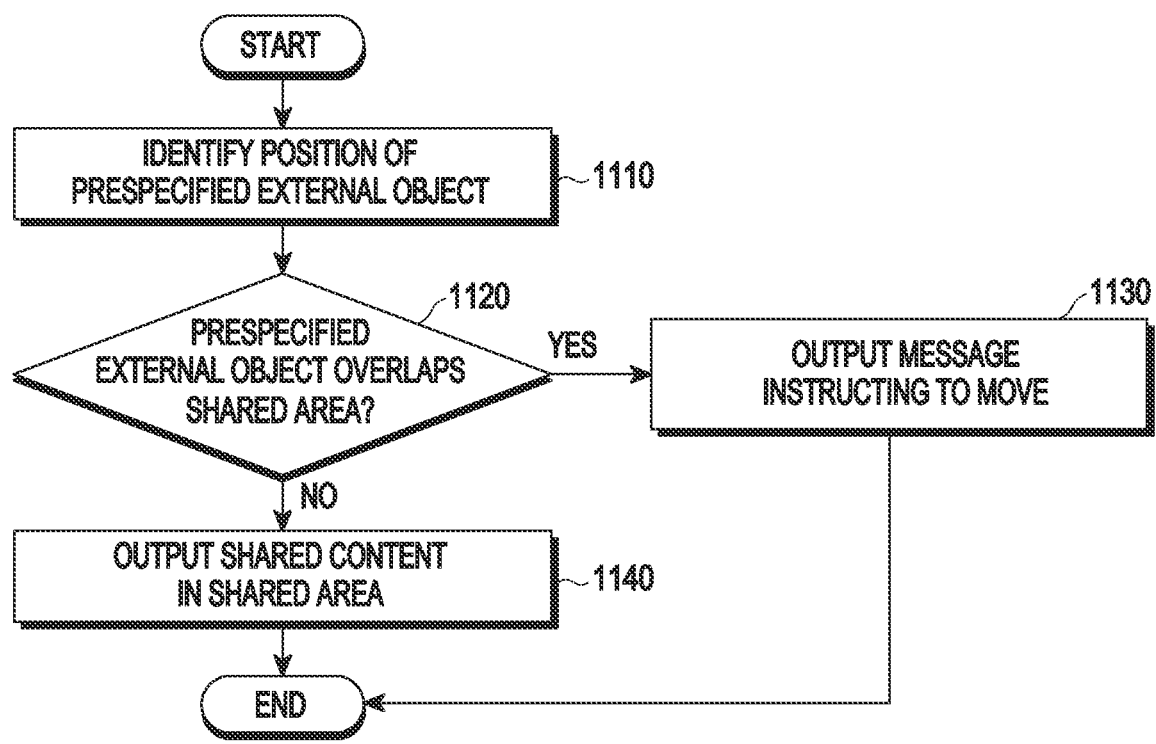
FIG. 11 is a flowchart illustrating operations performed in an augmented reality device according to various embodiments.

FIG. 11 is a flowchart illustrating operations performed in an augmented reality device according to various embodiments.

In operation 1110, at least one processor (e.g., the processor 220) of the augmented reality device (e.g., the augmented reality device 200) may identify the position of a predefined external object. Details regarding operation 910a of FIG. 9A may be equally applied to operation 1110.

In operation 1120, at least one processor (e.g., the processor 220) of the augmented reality device (e.g., the augmented reality device 200) may identify whether the predefined external object overlaps the shared area. Details regarding operation 920a of FIG. 9A may be equally applied to operation 1120.

When it is identified that the predefined external object overlaps the shared area in operation 1120, the at least one processor (e.g., the processor 220) of the augmented reality device (e.g., the augmented reality device 200) may display a message instructing the user to move in operation 1130. According to various embodiments, the message may be a message urging the user of the augmented reality device 200 to move the external object to a position or direction where it does not overlap the shared area.

When it is identified that the predefined external object does not overlap the shared area in operation 1120, the at least one processor (e.g., the processor 220) of the augmented reality device (e.g., the augmented reality device 200) may display shared content in the shared area in operation 1140.

As described above in connection with FIG. 3, at least some of the operations of FIG. 11 may be performed on an electronic device (e.g., the electronic device 401) connected with the augmented reality device 200. In this case, before performing operation 1110, the electronic device 401 may receive, from the augmented reality device 200, an image obtained through the first camera 211 of the augmented reality device 200 and, in operation 1110, perform image analysis by referring to the memory (e.g., the memory 430) of the electronic device 401 or transmit the image through the communication circuit (e.g., the communication module 490) to the server (e.g., the server 310) and receive a result of image analysis from the server 310 having performed the image analysis. Further, displaying content when operations 1130 and 1140 are performed by the electronic device 401 may be replaced with transmitting display information for displaying content on the augmented reality device 200 through a communication circuit (e.g., the communication circuit 270), rather than displaying content on the display (e.g., the display module 460) of the electronic device 401 connected with the augmented reality device 200. In this case, the augmented reality device 200 receiving the display information from the electronic device 401 may display the content on the display (e.g., the display module 250) based on the display information.

Figure 12A:
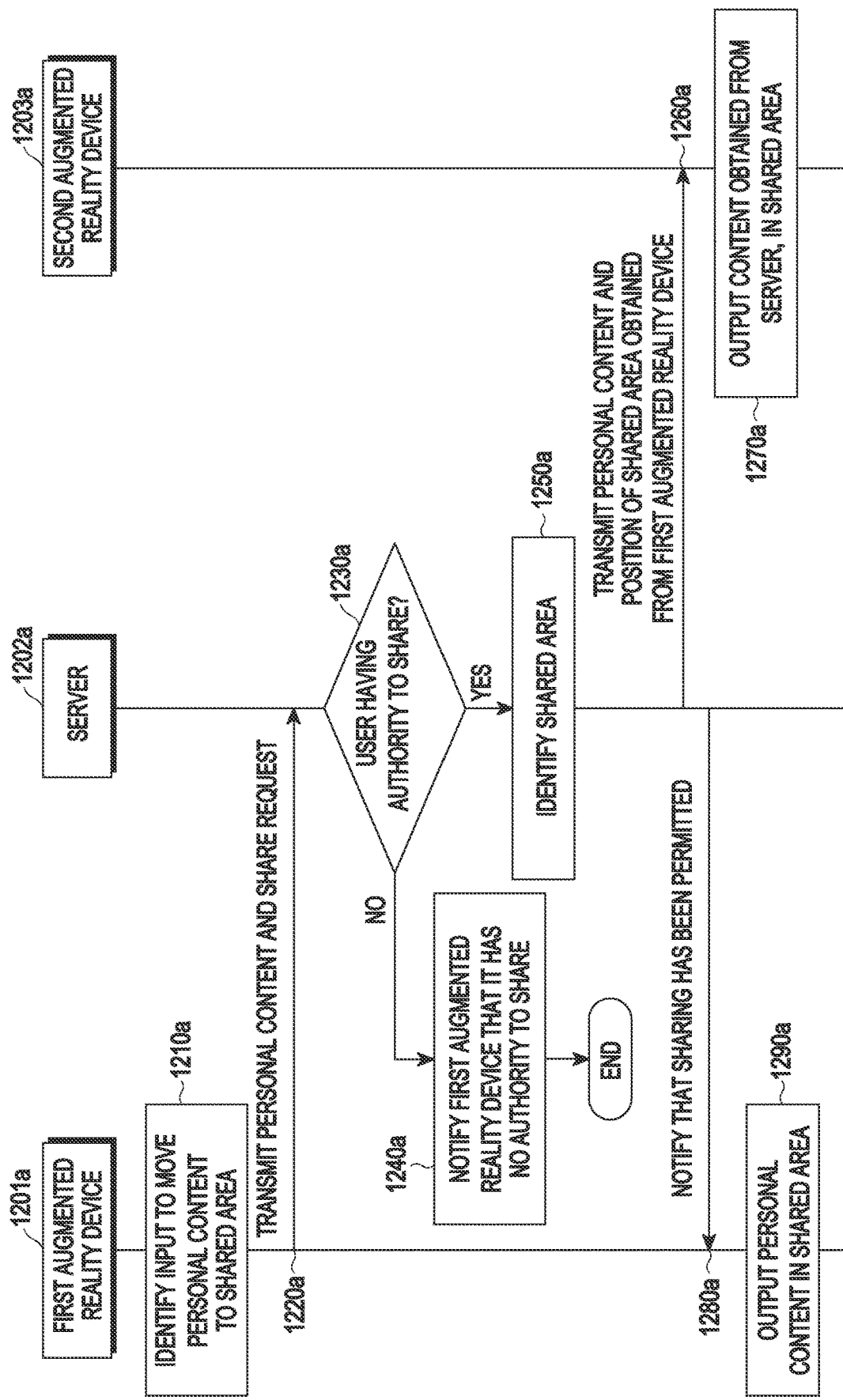
FIG. 12A illustrates operations of augmented reality devices and a server according to various embodiments.

FIG. 12A illustrates operations of augmented reality devices and a server according to various embodiments.

In operation 1210a, at least one processor (e.g., the processor 220) of a first augmented reality device 1201a may identify an input to move personal content to the shared area. For example, the first augmented reality device 1201a may obtain information including Cartesian coordinates for a specified shared area from a server 1202a or may be outputting, in a specified shared area, content shared through the server 1202a. According to various embodiments, the input to move the personal content to the shared area may include an input for selecting personal content and an input to move the position of the personal content over the shared area. According to various embodiments, as described above with reference to operation 510 of FIG. 5, the user input may be at least one of an input through a controller, an input identified through eye tracking, or a gesture input.

In operation 1220a, the at least one processor (e.g., the processor 220) of the first augmented reality device 1201a may transmit personal content and a share request to the server 1202a. For example, the personal content may include virtual content being displayed on the first augmented reality device 1201a or data stored in the first augmented reality device 1201a.

In operation 1230a, the server 1202a may identify whether the user of the first augmented reality device 1201a is a user having the authority to share content. According to various embodiments, the server 1202a may store a list of augmented reality devices granted the authority to control the shared area and identify whether the first augmented reality device 1201a is included in the stored list to thereby identify whether the user of the first augmented reality device 1201a is a user having the authority to share content.

When it is identified that the user of the first augmented reality device 1201a is not a user having the authority to share in operation 1230a, the server 1202a may notify the first augmented reality device 1201a that it has no authority to share in operation 1240a. In this case, in response to reception of the notification of having no authority, the first augmented reality device 1201a may transmit a request for the authority to share to another augmented reality device or the server 1202a. When the server 1202a receives the request for the authority to share, the server 1202a may transfer the request to another augmented reality device having the authority to share and, based on a response from the other augmented reality device, may grant or may not grant the authority to share to the augmented reality device 1201a.

When it is identified that the user of the first augmented reality device 1201a has the authority to share in operation 1230a, the server 1202a may identify the shared area in operation 1250a. According to various embodiments, before performing operation 1250a, the server 1202a may receive information about the shared area from the first augmented reality device 1201a or the other augmented reality device granted the authority to control the shared area.

In operation 1260a, the server 1202a may transmit, to a second augmented reality device 1203a, the personal content received in operation 1220a and the position of the shared area identified in operation 1250a. According to an embodiment, the second augmented reality device 1203a may be a device sharing the content, displayed in a designated shared area through the server 1202a, with the first augmented reality device 1201a. For example, the second augmented reality device 1203a may be determined by the first augmented reality device 1201a before transmitting the personal content and share request to the server through operation 1220a, designated as a sharing target by the first augmented reality device 1201a when the first augmented reality device 1201a performs operation 1220a, or determined by the server 1202a before the server 1202a performs operation 1260a.

In operation 1270a, the at least one processor (e.g., the processor 220) of the second augmented reality device 1203a (e.g., the augmented reality device 200) may output the content obtained from the server 1202a in the shared area based on the position of the shared area obtained from the server 1202a.

In operation 1280a, the server 1202a may notify the first augmented reality device 1201a that content sharing has been permitted. According to various embodiments, operation 1280a may be omitted.

In operation 1290a, the at least one processor (e.g., the processor 220) of the first augmented reality device 1201a (e.g., the augmented reality device 200) may display specific personal content in the shared area in operation 1210a. For example, when the first augmented reality device 1201a moves personal content, configured in the body lock scheme or personal world lock scheme, to the shared area and displays it in the shared area, the scheme of displaying the personal content may be changed from the body lock scheme or personal world lock scheme to the shared world lock scheme.

Figure 12B:
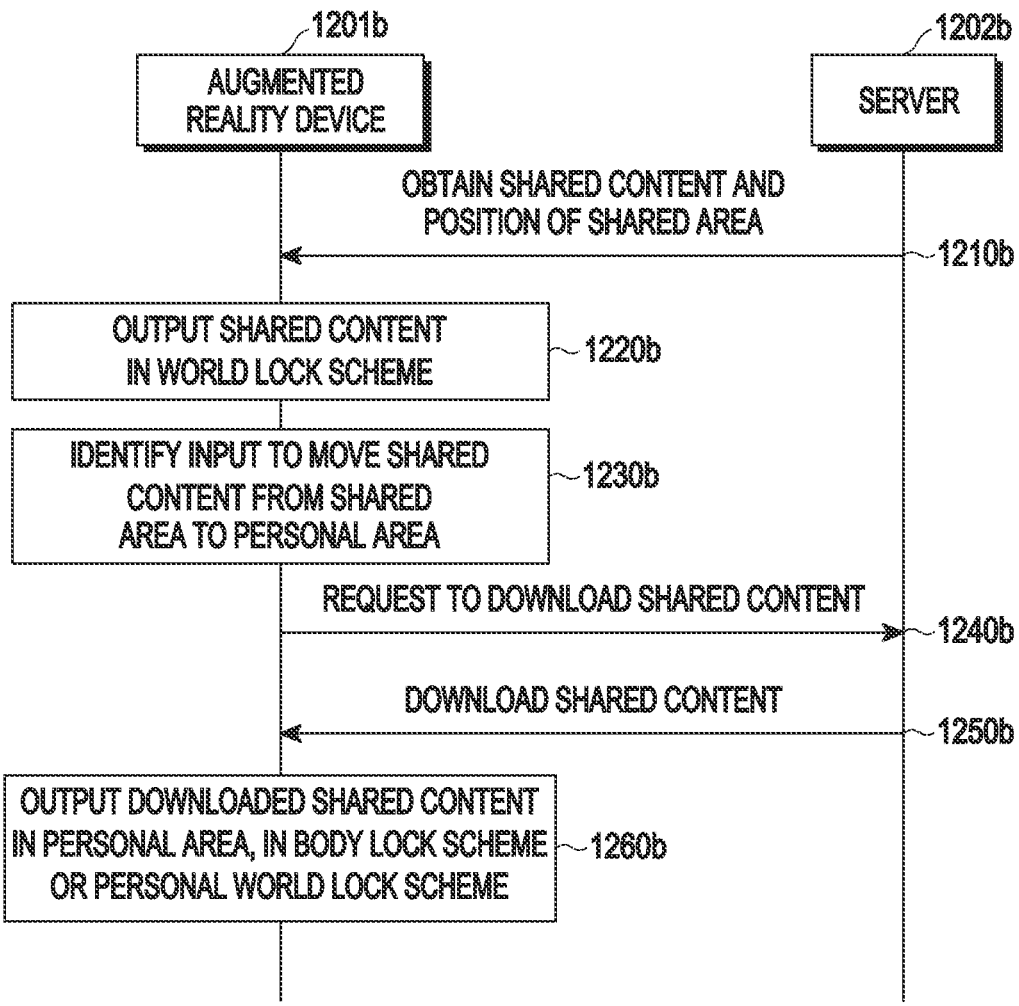
FIG. 12B illustrates operations of an augmented reality device and a server according to various embodiments.

As described above in connection with FIG. 3, at least some of the operations of FIGS. 12A and 12B may be performed on an electronic device (e.g., the electronic device 401) connected with the augmented reality device 200 (e.g., the first augmented reality device 1201a). In this case, for the electronic device 401 to perform operation 1210a may include for the electronic device 401 to receive a signal indicating that there was a user's input through the augmented reality device 200 from the augmented reality device 200 and to identify that the electronic device 401 is used as a controller of the augmented reality device 200 and identify that the input to allow the electronic device 401 to move the personal content to the shared area has been made through the electronic device 401.

Further, displaying content when operations 1270a and 1290a are performed by the electronic device 401 may be replaced with transmitting display information for displaying content on the augmented reality device 200 through a communication circuit (e.g., the communication circuit 270), rather than displaying content on the display (e.g., the display module 460) of the electronic device 401 connected with the augmented reality device 200. In this case, the augmented reality device 200 receiving the display information from the electronic device 401 may display the content on the display (e.g., the display module 250) based on the display information.

FIG. 12B illustrates operations of an augmented reality device and a server according to various embodiments.

In operation 1210b, at least one processor (e.g., the processor 220) of an augmented reality device 1201b may receive, from a server 1202b, shared content and the position of a shared area for displaying the shared content. The shared content may mean content provided to the server 1202b so as to be provided from a device other than the augmented reality device 1201b to the augmented reality device 1201b.

In operation 1220b, the at least one processor (e.g., the processor 220) of the augmented reality device 1201b may display the shared content received in operation 1210b, in the form of a virtual object, in the shared area, in the world lock scheme.

In operation 1230b, the at least one processor (e.g., the processor 220) of the augmented reality device 1201b may identify an input to move the shared content displayed in the shared area from the shared area to the personal area. According to various embodiments, the personal area may be an area not overlapping the shared area. According to various embodiments, as described above with reference to operation 510 of FIG. 5, the user input may be at least one of an input through a controller, an input identified through eye tracking, or a gesture input.

In operation 1240b, the at least one processor (e.g., the processor 220) of the augmented reality device 1201b may transmit a request for downloading shared content to the server 1202b.

In operation 1250b, the at least one processor (e.g., the processor 220) of the augmented reality device 1201b may download shared content from the server 1202b. According to an embodiment, before permitting the augmented reality device 1201b to download the shared content, the server 1202b may identify whether the augmented reality device 1201b has the authority to download and, only when the augmented reality device 1201b has the authority to download, permit the augmented reality device 1201b to download the shared content.

In operation 1260b, the at least one processor (e.g., the processor 220) of the augmented reality device 1201b may display the shared content, downloaded from the server 1202b, in the personal area in the body lock scheme or personal world lock scheme.

Figure 13:
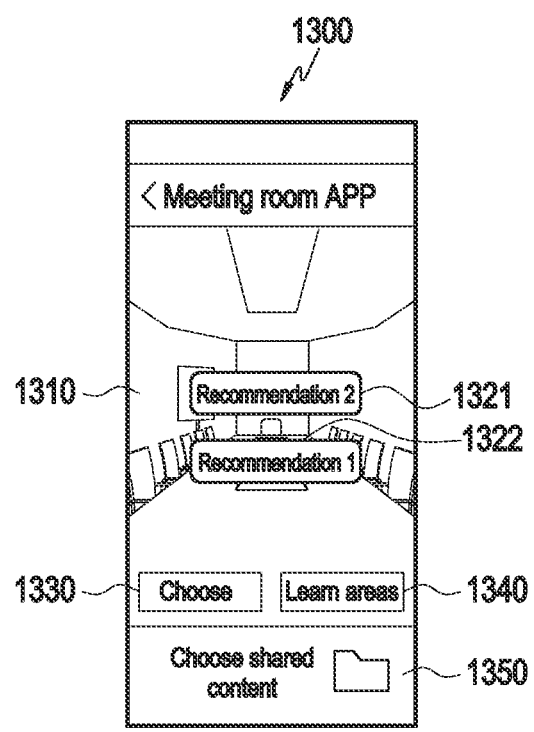
FIG. 13 illustrates an example of a screen output on an electronic device interacting with an augmented reality device according to various embodiments.

FIG. 13 illustrates an example of a screen displayed on an electronic device interacting with an augmented reality device according to various embodiments. For example, FIG. 13 illustrates a screen displayed for an electronic device (e.g., the electronic device 320 of FIG. 3) interacting with an augmented reality device (e.g., the augmented reality device 330 of FIG. 3) to identify a user input to specify a shared area as in operation 510 of FIG. 5.

Referring to FIG. 13, an image 1310 indicating a meeting place may be displayed in a screen 1300, and a plurality of candidate areas 1321 and 1322 recommended as shared areas in the meeting place may be overlaid and displayed on an image 1310. For example, a candidate area 1321 may be a front wall area, and a candidate area 1322 may be a middle area of the meeting room desk. According to various embodiments, if one candidate area is selected from among the plurality of candidate areas 1321 and 1322, the selected candidate area may be displayed visually in a different manner from the other candidate areas and, if 'choose' 1330 is selected in that state, the candidate area, which is displayed visually in a different manner from the other candidate areas, may be finally selected as a shared area. According to various embodiments, an interface indicating 'learn areas' 1340 may be displayed on the screen 1300. For example, when 'learn areas' 1340 is selected, the electronic device 320 may capture the ambient environment through a camera (e.g., the camera module 480 of FIG. 4) of the electronic device 320 or a camera (e.g., the first camera 211 or third camera 213 of FIG. 2) of the augmented reality device 330. The electronic device 320 or the server (e.g., the server 310 of FIG. 3) may generate candidate areas based on information about the captured ambient environment. According to various embodiments, an interface for starting 'choose shared content' 1350 may be displayed on the screen 1300. For example, when 'choose shared content' 1350 is performed on the electronic device 320, and at least one content stored in the electronic device 320 is shared, the content selected to be shared may be transmitted to the server 310, and the server 310 may generate virtual content corresponding to the selected content and transmit the generated virtual content, along with the information about the shared area selected on the electronic device 320, to the sharing target (e.g., the augmented reality device 340 of FIG. 3).

FIG. 13 exemplifies a screen displayed on the electronic device 320 interacting with the augmented reality device 330. However, according to various embodiments, similar to the screen 1300 shown in FIG. 13, a plurality of candidate areas recommended as shared areas in the meeting place may be overlaid and displayed also on the augmented reality device 340, and at least one area may be finally selected as a shared area from among the plurality of candidate areas based on the user's selection.

Figure 14:
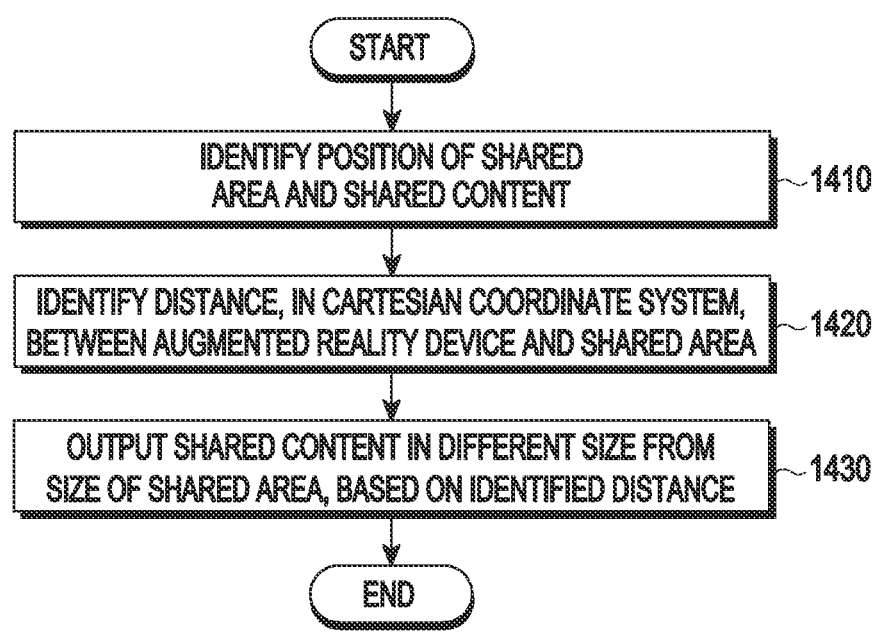
FIG. 14 is a flowchart illustrating operations performed in an augmented reality device according to various embodiments.

FIG. 14 is a flowchart illustrating operations performed in an augmented reality device according to various embodiments.

In operation 1410, at least one processor (e.g., the processor 220) of an augmented reality device (e.g., the augmented reality device 200) may identify the position of a shared area and shared content. According to various embodiments, the position of the shared area may be a position specified by a user input to the augmented reality device 200 or a position obtained from the server (e.g., the server 310) by the augmented reality device 200. According to various embodiments, the shared content may be content shared by the augmented reality device 200 or may be content shared by an electronic device (e.g., an augmented reality device) other than the augmented reality device 200 and obtained from the server (e.g., the server 310) by the augmented reality device 200.

In operation 1420, the at least one processor (e.g., the processor 220) of the augmented reality device (e.g., the augmented reality device 200) may identify the distance between the augmented reality device 200 and the shared area in the Cartesian coordinate system. According to various embodiments, the at least one processor 220 may identify the distance, in the Cartesian coordinate system, between the augmented reality device 200 and the shared area based on position information about the augmented reality device 200 obtained through at least one sensor and the position of the shared area identified in operation 1410.

In operation 1430, the at least one processor (e.g., the processor 220) of the augmented reality device (e.g., the augmented reality device 200) may display the shared content in a size different from the size of the shared area, based on the distance identified in operation 1420. According to various embodiments, when the identified distance is a predetermined first distance or less, the at least one processor 220 may shrink and display the shared content in a smaller size than the size of the shared area. According to various embodiments, when the identified distance is a predetermined second distance or more, the at least one processor 220 may enlarge and display the shared content in a larger size than the size of the shared area. According to various embodiments, the at least one processor 220 may enlarge or shrink and display the shared content as compared with the shared area so that the size of the shared content recognized by the user of the augmented reality device 200 is constant regardless of the identified distance. According to an embodiment, the shared content may include information about the center point of the shared area and the spatial size of the shared content. For example, in displaying the shared content based on the spatial size of the shared content and the center point of the shared area of the shared content, the augmented reality device 200 may enlarge or shrink and display the shared content based on the distance between the user and the center point of the shared area. According to another embodiment, the shared content may include only the center point information about the shared area. For example, in displaying the shared content based on the center point of the shared area of the shared content, if the shared area is included in the user's FOV, the augmented reality device 200 may display the shared content, in a designated size, in a designated distance from the user.

According to various embodiments, an augmented reality device (e.g., the augmented reality device 200) may comprise a display (e.g., the display 250), at least one sensor (e.g., the sensor 280), a communication circuit (e.g., the communication circuit 270), and at least one processor (e.g., the processor 220) operatively connected with the display 250, the at least one sensor 280, and the communication circuit 270. The at least one processor 220 may be configured to identify a first user input specifying a shared area for outputting shared content to be output on at least one other augmented reality device, transmit information about the shared area to a server through the communication circuit 270, based on the first user input, identify whether the shared area and a personal area for outputting personal content overlap, based on information obtained through the at least one sensor 280, control the display 250 to output the shared content in the shared area and the personal content in the personal area, based on identifying that the shared area and the personal area do not overlap, and control the display 250 to output the shared content in the shared area and the personal content in an area not overlapping the shared area, based on identifying that the shared area and the personal area overlap.

According to various embodiments, the at least one processor 220 may be configured to identify that the shared area is not included in a field of view (FOV), based on the information obtained through the at least one sensor 280 and control the display 250 to display an object indicating the shared area, based on identifying that the shared area is not included in the FOV.

According to various embodiments, the shared area may have fixed Cartesian coordinates.

According to various embodiments, the personal area may have a position in a fixed FOV or fixed Cartesian coordinates.

According to various embodiments, the at least one processor 220 may be configured to identify that the personal area overlaps a prespecified external object, based on the information obtained through the at least one sensor 280 and control the display 250 to output the personal content in a position not overlapping the prespecified external object, different from the personal area, based on identifying that the personal area overlaps the prespecified external object.

According to various embodiments, the at least one processor 220 may be configured to identify that the shared area overlaps a prespecified external object, based on the information obtained through the at least one sensor 280 and control the display 250 to output a message instructing to move so that the shared area does not overlap the prespecified external object, based on identifying that the shared area overlaps the prespecified external object.

According to various embodiments, the at least one processor 220 may be configured to identify an input to move the personal content to the shared area, based on the information obtained through the at least one sensor 280, transmit the personal content to the server based on identifying the input to move the personal content to the shared area, and control the display 250 to output the personal content in the shared area. The shared area may have fixed Cartesian coordinates.

According to various embodiments, the at least one processor 220 may be configured to control the display 250 to output a plurality of candidate areas of the shared area before identifying the first user input. The first user input may specify one of the plurality of candidate areas, as the shared area.

According to various embodiments, the at least one processor 220 may be configured to identify a distance, in a Cartesian coordinate system, between the augmented reality device 200 and the shared area, based on the information obtained through the at least one sensor 280 and control the display 250 to output the shared content in a size different from a size of the shared area, based on the distance.

According to various embodiments, an augmented reality device (e.g., the augmented reality device 200) may comprise a display (e.g., the display 250), at least one sensor (e.g., the sensor 280), a communication circuit (e.g., the communication circuit 270), and at least one processor (e.g., the processor 220) operatively connected with the display 250, the at least one sensor 280, and the communication circuit 270. The at least one processor 220 may be configured to obtain shared content and information indicating a position of a shared area for outputting the shared content, from a server through the communication circuit 270, identify whether the shared area and a personal area for outputting personal content overlap, based on information obtained through the at least one sensor 280, control the display 250 to output the shared content in the shared area and the personal content in the personal area, based on identifying that the shared area and the personal area do not overlap, and control the display 250 to output the shared content in the shared area and the personal content in an area not overlapping the shared area, based on identifying that the shared area and the personal area overlap.

According to various embodiments, the at least one processor 220 may be configured to identify that the shared area is not included in a field of view (FOV), based on the information obtained through the at least one sensor 280 and control the display 250 to output an object indicating the shared area, based on identifying that the shared area is not included in the FOV.

According to various embodiments, the shared area may have fixed Cartesian coordinates.

According to various embodiments, the personal area may have a position in a fixed FOV or fixed Cartesian coordinates.

According to various embodiments, the at least one processor 220 may identify that the personal area overlaps a prespecified external object, based on information obtained through the at least one sensor 280 and control the display 250 to output the personal content in a position identified based on a position and/or direction of the prespecified external object, based on identifying that the personal area overlaps the prespecified external object.

According to various embodiments, the at least one processor 220 may be configured to identify that the shared area overlaps a prespecified external object, based on the information obtained through the at least one sensor 280 and control the display 250 to output a message instructing to move so that the shared area does not overlap the prespecified external object, based on identifying that the shared area overlaps the prespecified external object.

According to various embodiments, the at least one processor 220 may be configured to identify a distance, in a Cartesian coordinate system, between the augmented reality device 200 and the shared area, based on the information obtained through the at least one sensor 280 and control the display 250 to output the shared content in a size different from a size of the shared area, based on the distance.

According to various embodiments, an electronic device (e.g., the electronic device 401) may comprise a communication circuit (e.g., the communication circuit 490) and at least one processor (e.g., the processor 420) operatively connected with the communication circuit. The at least one processor 420 may be configured to obtain shared content and information indicating a position of a shared area for outputting the shared content, from a server (e.g., the server 408) through the communication circuit 490, obtain information obtained through at least one sensor (e.g., the sensor 280) of an augmented reality device, from the augmented reality device (e.g., the augmented reality device 200) through the communication circuit 490, identify whether the shared area and a personal area for outputting personal content overlap, based on the information obtained through the at least one sensor 280 of the augmented reality device 200, transmit, to the augmented reality device 200 through the communication circuit 490, display information to allow the augmented reality device 200 to output the shared content in the shared area and output the personal content in the personal area, based on identifying that the shared area and the personal area do not overlap, and transmit, to the augmented reality device 200 through the communication circuit 490, display information to allow the augmented reality device 200 to output the shared content in the shared area and the personal content in an area not overlapping the shared area, based on identifying that the shared area and the personal area overlap.

According to various embodiments, the at least one processor 420 may be configured to identify a first user input specifying the shared area, and transmit information about the shared area to the server 408 through the communication circuit 490, based on the first user input.

According to various embodiments, the at least one processor 420 may be configured to output a plurality of candidate areas of the shared area before identifying the first user input. The first user input may specify one of the plurality of candidate areas, as the shared area.

According to various embodiments, the shared area may have fixed Cartesian coordinates. The personal area may have a position in a fixed FOV or fixed Cartesian coordinates.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., an internal memory 436 or an external memory 438) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality device comprising:
  a display;
  at least one sensor;
  a communication circuit;
  at least one processor; and
  memory storing instructions that, when executed by the at least one processor, cause the augmented reality device to:
    identify a first user input specifying a virtual shared area in a specific space for displaying shared content to be displayed on at least one other augmented reality device,
    transmit information about the virtual shared area to a server through the communication circuit, based on the first user input,
    identify whether the virtual shared area and a virtual personal area of the augmented reality device in the specific space for displaying personal content overlap, based on information obtained through the at least one sensor,
    control the display to display the shared content in the virtual shared area and the virtual personal content in the virtual personal area, based on identifying that the virtual shared area and the virtual personal area do not overlap, and
    control the display to display the shared content in the virtual shared area and the personal content in an area of the virtual personal area that does not overlap with the virtual shared area, based on identifying that the virtual shared area and the virtual personal area overlap, and
  wherein the instructions, when executed by the at least one processor, cause the augmented reality device to:
    identify whether an object of a real-world overlaps with the virtual personal area, wherein the object of the real-world includes an object having a field of view (FOV),
    based on identifying that the object overlaps with the virtual personal area, identify whether the augmented reality device is positioned in the field of view (FOV) of the object, and
    based on identifying that the augmented reality device is positioned in the field of view (FOV) of the object, control the display to display the personal content in a virtual area that does not overlap with the object, wherein the virtual area is different from the virtual personal area and the virtual shared area.

2. The augmented reality device of claim 1, wherein the instructions, when executed by the at least one processor, cause the augmented reality device to:

identify that the virtual shared area is not included in a field of view (FOV) of the augmented reality device, based on the information obtained through the at least one sensor, and control the display to display an object indicating the virtual shared area, based on identifying that the virtual shared area is not included in the FOV of the augmented reality device.

3. The augmented reality device of claim 1, wherein the virtual shared area has fixed Cartesian coordinates.

4. The augmented reality device of claim 1, wherein the virtual personal area has a position in a fixed field of view (FOV) of the augmented reality device or fixed Cartesian coordinates.

5. The augmented reality device of claim 1, wherein the instructions, when executed by the at least one processor, cause the augmented reality device to:

identify that the virtual shared area overlaps the object, based on the information obtained through the at least one sensor, and control the display to display a message instructing to move so that the virtual shared area does not overlap the object, based on identifying that the virtual shared area overlaps the object.

6. The augmented reality device of claim 1, wherein the instructions, when executed by the at least one processor, cause the augmented reality device to:

identify an input to move the personal content to the virtual shared area, based on the information obtained through the at least one sensor, transmit the personal content to the server based on identifying the input to move the personal content to the virtual shared area, and control the display to display the personal content in the virtual shared area, and wherein the virtual shared area has fixed Cartesian coordinates.

7. The augmented reality device of claim 1, wherein the instructions, when executed by the at least one processor, cause the augmented reality device to control the display to display a plurality of candidate areas of the virtual shared area before identifying the first user input, and wherein the first user input specifies one of the plurality of candidate areas, as the virtual shared area.

8. The augmented reality device of claim 1, wherein the instructions, when executed by the at least one processor, cause the augmented reality device to:

identify a distance, in a Cartesian coordinate system, between the augmented reality device and the virtual shared area, based on the information obtained through the at least one sensor, and control the display to display the shared content in a size different from a size of the virtual shared area, based on the distance.

9. An augmented reality device comprising:
a display;
at least one sensor;
a communication circuit;
at least one processor; and
memory storing instructions that, when executed by the at least one processor, cause the augmented reality device to:

obtain shared content and information indicating a position of a virtual shared area in a specific space for displaying the shared content, from a server through the communication circuit, identify whether the virtual shared area and a virtual personal area of the augmented reality device in the specific space for displaying personal content overlap, based on information obtained through the at least one sensor, control the display to display the shared content in the virtual shared area and the personal content in the virtual personal area, based on identifying that the virtual shared area and the virtual personal area do not overlap, and control the display to display the shared content in the virtual shared area and the personal content in an area of the virtual personal area that does not overlap with the virtual shared area, based on identifying that the virtual shared area and the virtual personal area overlap, and wherein the instructions, when executed by the at least one processor, cause the augmented reality device to:

identify that an object of a real-world overlaps with the virtual personal area, wherein the object of the real-world includes an object having a field of view (FOV), based on identifying that the object overlaps with the virtual personal area, identify whether the augmented reality device is positioned in the field of view (FOV) of the object, and based on identifying that the augmented reality device is positioned in the field of view (FOV) of the object, control the display to display the personal content in a virtual area that does not overlap with the object, wherein the virtual area is different from the virtual personal area and the virtual shared area.

10. The augmented reality device of claim 9, wherein the instructions, when executed by the at least one processor, cause the augmented reality device to:

identify that the virtual shared area is not included in a field of view (FOV) of the augmented reality device, based on the information obtained through the at least one sensor, and control the display to display an object indicating the virtual shared area, based on identifying that the virtual shared area is not included in the FOV of the augmented reality device.

11. The augmented reality device of claim 9, wherein the virtual shared area has fixed Cartesian coordinates.

12. The augmented reality device of claim 9, wherein the virtual personal area has a position in a fixed field of view (FOV) of the augmented reality device or fixed Cartesian coordinates.

13. The augmented reality device of claim 9, wherein the instructions, when executed by the at least one processor, cause the augmented reality device to:

identify at least one of a position or direction of the external object, based on the information obtained through the at least one sensor, and control the display to display the personal content in a position identified based on at least one of the position or direction of the object.

14. The augmented reality device of claim 9, wherein the instructions, when executed by the at least one processor, cause the augmented reality device to:

identify that the virtual shared area overlaps the object, based on the information obtained through the at least one sensor, and control the display to display a message instructing to move so that the virtual shared area does not overlap the object, based on identifying that the virtual shared area overlaps the object.

15. The augmented reality device of claim 9, wherein the instructions, when executed by the at least one processor, cause the augmented reality device to: identify a distance, in a Cartesian coordinate system, between the augmented reality device and the virtual shared area, based on the information obtained through the at least one sensor, and control the display to display the shared content in a size different from a size of the virtual shared area, based on the distance.

16. An electronic device comprising:
a communication circuit;
at least one processor, and
memory storing instructions that, when executed by the at least one processor, cause the electronic device to:
obtain shared content and information indicating a position of a virtual shared area in a specific space for displaying the shared content, from a server through the communication circuit,
obtain information obtained through at least one sensor of an augmented reality device, from the augmented reality device through the communication circuit,
identify whether the virtual shared area and a virtual personal area of the augmented reality device in the specific space for displaying personal content overlap, based on the information obtained through the at least one sensor of the augmented reality device,
transmit, to the augmented reality device through the communication circuit, display information to allow the augmented reality device to display the shared content in the virtual shared area and display the personal content in the virtual personal area, based on identifying that the virtual shared area and the virtual personal area do not overlap, and
transmit, to the augmented reality device through the communication circuit, display information to allow the augmented reality device to display the shared content in the virtual shared area and the personal content in an area of the virtual personal area that does not overlap with the virtual shared area, based on identifying that the virtual shared area and the virtual personal area overlap, and
wherein the instructions, when executed by the at least one processor, cause the electronic device to,
identify that an object of a real-world overlaps with the virtual personal area, wherein the object of the real-world includes an object having a field of view (FOV),
based on identifying that the object overlaps with the virtual personal area, identify whether the augmented reality device is positioned in the field of view (FOV) of the object, and
based on identifying that the augmented reality device is positioned in the field of view (FOV) of the object, transmit, to the augmented reality device through the communication circuit, display information to allow the augmented reality device to display the personal content in a virtual area that does not overlap with the object, wherein the virtual area is different from the virtual personal area and the virtual shared area.

17. The electronic device of claim 16, wherein the instructions, when executed by the at least one processor, cause the electronic device to:
identify a first user input specifying the virtual shared area, and
transmit information about the virtual shared area to the server through the communication circuit, based on the first user input.

18. The electronic device of claim 17,
wherein the instructions, when executed by the at least one processor, cause the electronic device to display a plurality of candidate areas of the virtual shared area before identifying the first user input, and
wherein the first user input specifies one of the plurality of candidate areas, as the virtual shared area.

19. The electronic device of claim 16,
wherein the virtual shared area has fixed Cartesian coordinates, and
wherein the virtual personal area has a position in a fixed field of view (FOV) of the augmented reality device or fixed Cartesian coordinates.

* * * * *